US012410024B2

(12) United States Patent
Shintani et al.

(10) Patent No.: US 12,410,024 B2
(45) Date of Patent: Sep. 9, 2025

(54) PULL-OUT LOCK DEVICE FOR SHEET CONTAINER AND IMAGE-FORMING APPARATUS INCLUDING THE SAME

(71) Applicant: SHARP KABUSHIKI KAISHA, Sakai (JP)

(72) Inventors: Hiroki Shintani, Sakai (JP); Toshihiko Seike, Sakai (JP); Shohtaroh Okamoto, Sakai (JP); Takahisa Narikiyo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 623 days.

(21) Appl. No.: 17/716,810

(22) Filed: Apr. 8, 2022

(65) Prior Publication Data

US 2022/0324665 A1 Oct. 13, 2022

(30) Foreign Application Priority Data

Apr. 12, 2021 (JP) ................................ 2021-067198

(51) Int. Cl.
*B65H 1/26* (2006.01)
*B65H 1/04* (2006.01)
*G03G 15/00* (2006.01)

(52) U.S. Cl.
CPC ............... *B65H 1/266* (2013.01); *B65H 1/04* (2013.01); *G03G 15/6502* (2013.01); *B65H 2402/60* (2013.01); *B65H 2405/121* (2013.01); *B65H 2405/32* (2013.01); *B65H 2405/332* (2013.01); *B65H 2801/03* (2013.01); *B65H 2801/06* (2013.01)

(58) Field of Classification Search
CPC .............. B65H 1/266; B65H 2405/121; B65H 2405/332; B65H 2402/60; G03G 15/6502
See application file for complete search history.

(56) References Cited

U.S. PATENT DOCUMENTS 5,845,899 A * 12/1998 Satoh .................... B65H 1/266
271/9.11

FOREIGN PATENT DOCUMENTS

JP H11-349157 A 12/1999

* cited by examiner

*Primary Examiner* — Jeremy R Severson
(74) *Attorney, Agent, or Firm* — ScienBiziP, P.C.

(57) ABSTRACT

In a lock member of a pull-out lock device, while two adjacent sheet containers are both located at an accommodated position in an image-forming apparatus main body, a contact member is in contact with one of the sheet containers and thus the lock member rotates around a rotation axis, and a lock moves to an unlock position to allow the other sheet container to move in a pull-out direction, and while the other sheet container is located at the accommodated position and the one of the sheet containers is pulled out from the accommodated position in the pull-out direction and thus the contact between the one of the sheet containers and the contact member is removed, the lock member rotates around the rotation axis and the lock moves to a lock position to prohibit the other sheet container from moving in the pull-out direction.

16 Claims, 33 Drawing Sheets

--Prior Art--

--Prior Art--

PULL-OUT LOCK DEVICE FOR SHEET CONTAINER AND IMAGE-FORMING APPARATUS INCLUDING THE SAME

BACKGROUND OF THE INVENTION

Field of the Invention

The present invention relates to a pull-out lock device for a sheet container and an image-forming apparatus including the same, such as copier, multifunction peripheral, printer device, and facsimile device.

Description of the Background Art

Image-forming apparatuses are often configured to allow a sheet container (sheet feed cassette) to be pulled out of an image-forming apparatus main body in a predetermined pull-out direction.

FIG. 22A is a side view schematically illustrating a conventional image-forming apparatus 100X configured to allow a sheet container to be pulled out of an image-forming apparatus main body 101X in a predetermined pull-out direction S1. FIG. 22B is a side view schematically illustrating the state where two or more sheet containers 111X and 112X are simultaneously pulled out of the image-forming apparatus main body 101X in the image-forming apparatus 100X illustrated in FIG. 22A.

As illustrated in FIGS. 22A and 22B, a sheet container is capable of loading a plurality of sheets, and a plurality of sheet containers is placed side by side in a vertical direction (a juxtaposition direction W) in the image-forming apparatus main body 101X. In the conventional image-forming apparatus 100X, when two or more sheet containers (111X and 112X in the example illustrated) among a plurality of sheet containers 111X to 114X are simultaneously pulled out (see FIG. 22B), the center of gravity of the image-forming apparatus 100X shifts to the pull-out side of the sheet containers 111X to 114X and the installation state of the image-forming apparatus 100X becomes unstable, or in some cases (when an external force is applied, for example, when the operator leans against the pulled-out sheet containers 111X and 112X), the image-forming apparatus 100X is likely to fall over to the pull-out side of the sheet containers 111X to 114X. This is particularly noticeable when the pulled-out sheet containers 111X to 114X are highly positioned, and/or the pulled-out sheet containers 111X to 114X load a large number of sheets P, such as recording paper, and/or the image-forming apparatus 100X is relatively light, such as a monochrome image-forming apparatus.

In order to eliminate such inconvenience, a conventional pull-out lock device for a sheet container is disclosed in which, when either one of the two adjacent sheet containers is pulled out of the image-forming apparatus main body, the other sheet container accommodated in the image-forming apparatus main body is prohibited from moving in a pull-out direction relative to the image-forming apparatus main body (See Japanese Unexamined Patent Application Publication No. 11-349157).

In particular, Japanese Unexamined Patent Application Publication No. 11-349157 discloses the configuration below. Specifically, a stopper member is held in a cassette container of a sheet feed device main body so as to move in a vertical direction. Two upper and lower sheet feed cassettes include movement control members for the stopper member, and the upper and lower movement control members are formed with recesses that selectively engage with and disengage from upper and lower ends of the stopper member only when the cassette is accommodated. A retainer is provided to bias and retain the stopper member in an engaged state while the upper and lower ends of the stopper member are engaged with the upper and lower recesses. Each of the upper and lower recesses includes a cam surface that, when either one of the upper and lower sheet feed cassettes is pulled out, causes the stopper member to engage with the recess on the side of the other sheet feed cassette.

However, the configuration described in Japanese Unexamined Patent Application Publication No. 11-349157 has a disadvantage such as a complicated configuration because, in order to prohibit the other sheet container from moving in the pull-out direction relative to the image-forming apparatus main body, the one of the sheet containers needs to include the movement control member formed with the recess that selectively engages with and disengages from the upper and lower ends of the stopper member and the retainer that biases and retains the stopper member in the engaged state.

Thus, the present invention has an object to provide a pull-out lock device for a sheet container and an image-forming apparatus including the same, with which the pull-out lock device for the sheet container may be easily implemented with a simple configuration.

SUMMARY OF THE INVENTION

In order to solve the above-described disadvantage, a pull-out lock device for a sheet container and an image-forming apparatus below are provided.

(1) Pull-Out Lock Device for Sheet Container

A pull-out lock device for a sheet container according to the present invention is a pull-out lock device provided in an image-forming apparatus main body that allows a sheet container to be pulled out in a predetermined pull-out direction, the sheet container is capable of loading a plurality of sheets and includes a plurality of sheet containers placed side by side in a vertical direction in the image-forming apparatus main body, and the pull-out lock device includes a lock member including: a main body that is attached so as to be rotatable around a rotation axis relative to the image-forming apparatus main body; a rotation member that supports the main body so as to be rotatable around the rotation axis; a contact member; and a lock, wherein while two adjacent sheet containers among the plurality of sheet containers are both located at an accommodated position in the image-forming apparatus main body, the contact member is in contact with one of the sheet containers and thus the lock member rotates around the rotation axis, and the lock moves to an unlock position to allow an other of the sheet containers to move in the pull-out direction, and when the other of the sheet containers is located at the accommodated position and the one of the sheet containers is pulled out in the pull-out direction from the accommodated position and a contact between the one of the sheet containers and the contact member is removed, the lock member rotates around the rotation axis, and the lock moves to a lock position to prohibit the other of the sheet containers from moving in the pull-out direction.

(2) Image-Forming Apparatus

An image-forming apparatus according to the present invention is an image-forming apparatus that allows a sheet container to be pulled out of an image-forming apparatus main body in a predetermined pull-out direction, and the image-forming apparatus includes the pull-out lock device for the sheet container according to the present invention, wherein the pull-out lock device includes a pair of lock members, and in one of the lock members, included in the pair of lock members, while the two adjacent sheet containers are both accommodated in the image-forming apparatus main body, the contact member is in contact with the one of the sheet containers, the one of the lock members rotates, and the lock moves to the unlock position to allow the other of the sheet containers to move in the pull-out direction, and while the other of the sheet containers is accommodated in the image-forming apparatus main body and the one of the sheet containers is pulled out of the image-forming apparatus main body and the contact between the one of the sheet containers and the contact member is removed, the lock moves to the lock position to prohibit the other of the sheet containers from moving in the pull-out direction, and in an other of the lock members, while the two adjacent sheet containers are both accommodated in the image-forming apparatus main body, the contact member is in contact with the other of the sheet containers, the other of the lock members rotates, and the lock moves to the unlock position to allow the one of the sheet containers to move in the pull-out direction, and while the one of the sheet containers is accommodated in the image-forming apparatus main body and the other of the sheet containers is pulled out of the image-forming apparatus main body and the contact between the contact member and the other of the sheet containers is removed, the lock moves to the lock position to prohibit the one of the sheet containers from moving in the pull-out direction.

According to the present invention, the pull-out lock device for the sheet container may be easily implemented with a simple configuration.

DESCRIPTION OF THE PREFERRED EMBODIMENTS

Figure 1A:
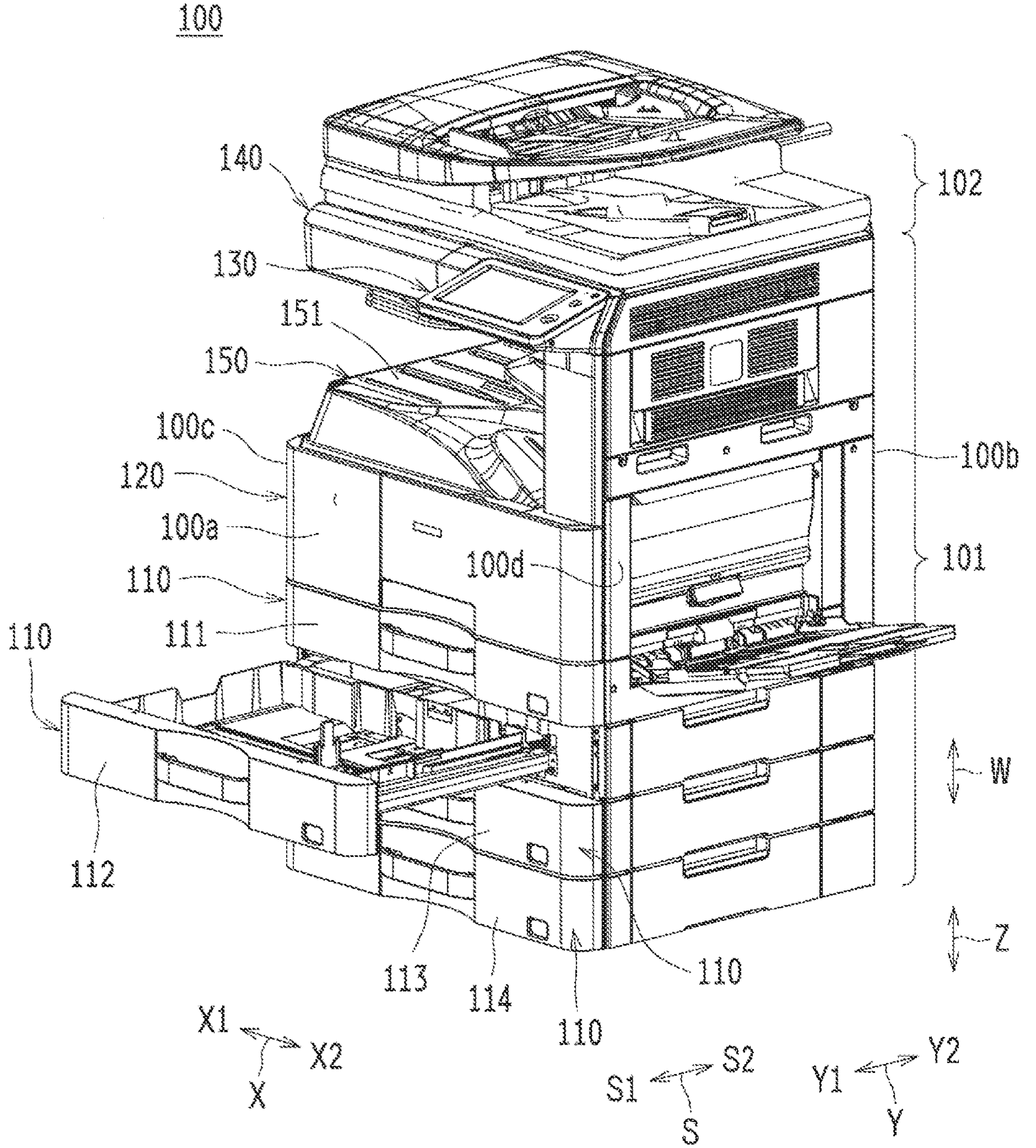
FIG. 1A is a perspective view illustrating the state where either one of sheet containers, which are adjacent in an image-forming apparatus according to an embodiment of the present invention, is pulled out of an image-forming apparatus main body.

Embodiments according to the present invention will be described below with reference to the drawings. In the following description, the same components are denoted by the same reference numeral. Their names and functions are also the same. Therefore, the detailed description thereof will not be repeated.

Image-Forming Apparatus

Figure 1B:
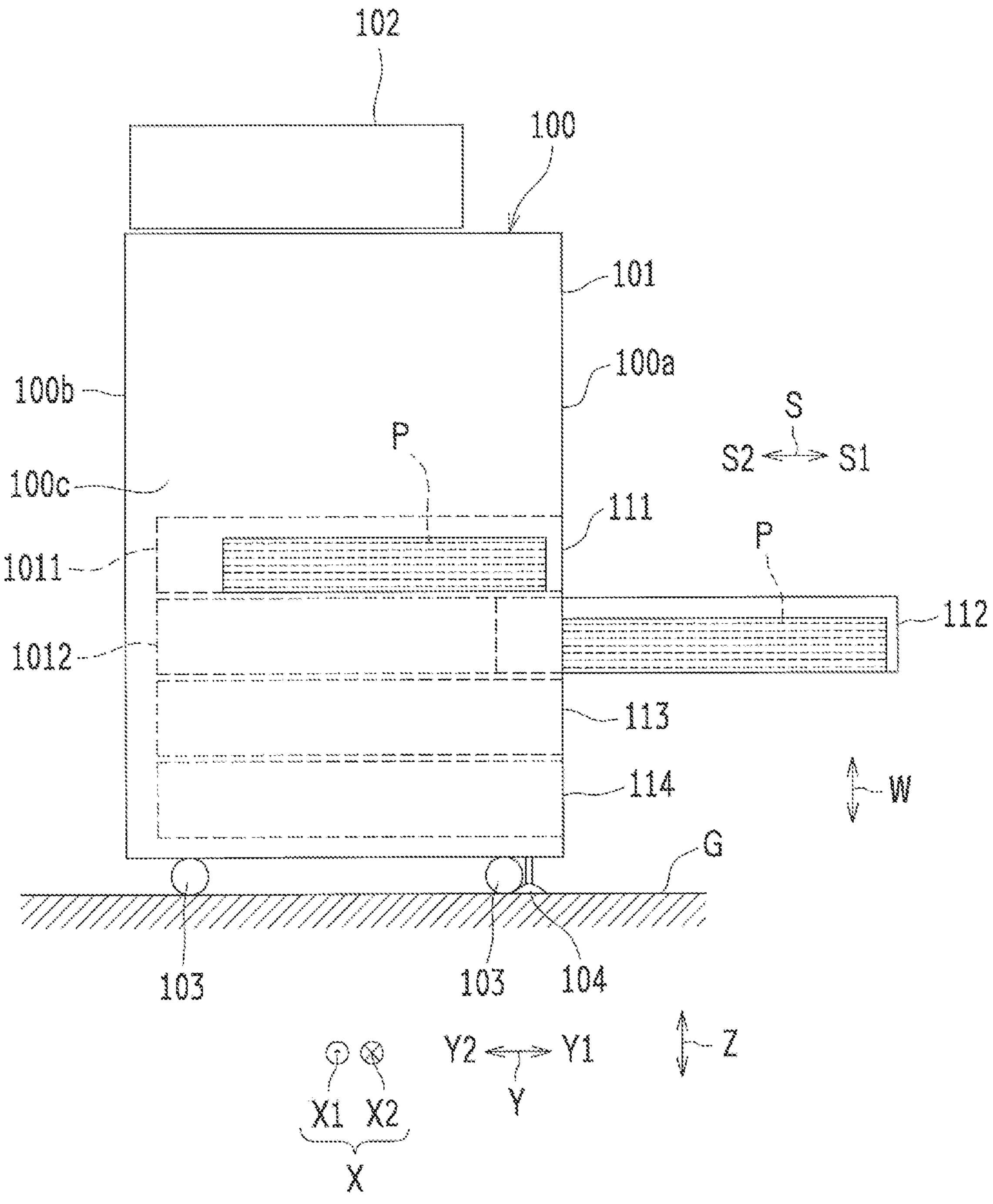
FIG. 1B is a side view schematically illustrating the image-forming apparatus illustrated in FIG. 1A.
Figure 2:
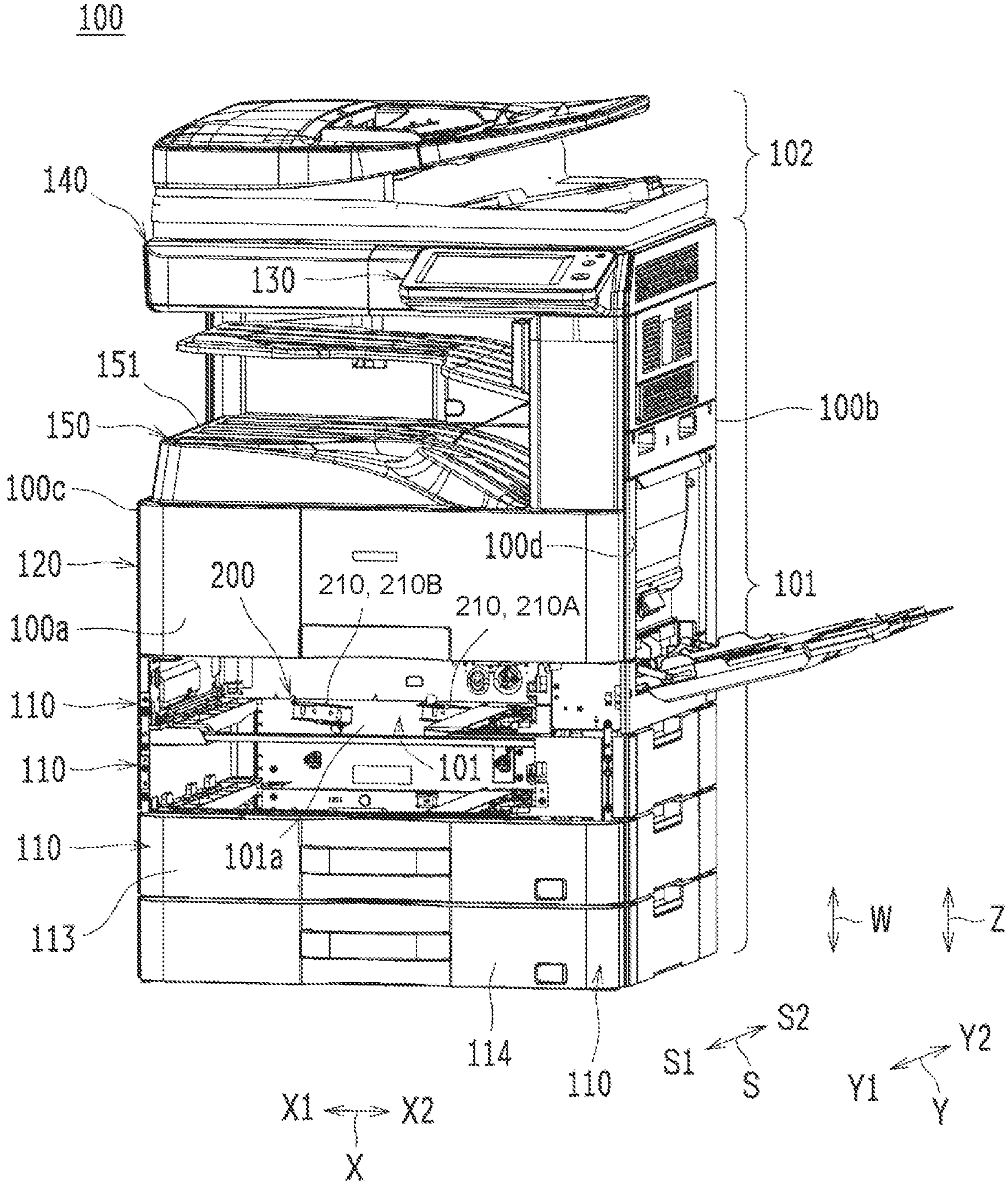
FIG. 2 is a perspective view illustrating the state where both the sheet containers, which are adjacent in the image-forming apparatus according to the embodiment of the present invention, have been removed.

FIG. 1A is a perspective view illustrating the state where either one sheet container (112) of sheet containers 111 and 112, which are adjacent in an image-forming apparatus 100 according to an embodiment of the present invention, is pulled out of an image-forming apparatus main body 101. FIG. 1B is a side view schematically illustrating the image-forming apparatus 100 illustrated in FIG. 1A. FIG. 2 is a perspective view illustrating the state where both the sheet containers 111 and 112, which are adjacent in the image-forming apparatus 100 according to the embodiment of the present invention, have been removed. In the figure, the reference mark X denotes a right-left direction, the reference mark Y denotes a front-back direction, and the reference mark Z denotes a vertical direction. The reference mark S denotes an insertion/removal direction of the sheet containers 111 to 114, the reference mark S1 denotes a pull-out direction of the sheet containers 111 to 114, and the reference mark S2 denotes an insertion direction of the sheet containers 111 to 114.

It is assumed that a surface of the image-forming apparatus 100 on the operation side is a front surface 100*a* (front) (Y1 side). It is assumed that the back side of the image-forming apparatus 100 when viewed from the front surface 100*a* is a rear surface 100*b* (rear) (Y2 side) and the left side and the right side when viewed from the front surface 100*a* are a left surface 100*c* (X1 side) and a right surface 100*d* (X2 side), respectively.

In this example, the image-forming apparatus 100 is a monochrome image-forming apparatus, including the image-forming apparatus main body 101 and a document feed device 102. The image-forming apparatus main body 101 has the shape of substantially a cuboid. As illustrated in FIG. 1B, the image-forming apparatus main body 101 includes four casters 103 to 103 (swivel wheels) and two stopper members 104, 104, which are installed on an installation surface G. The casters 103 to 103 are provided at the four corners of a bottom surface of the image-forming apparatus main body 101. The stopper members 104, 104 restrict the movement of the image-forming apparatus main body 101 by the casters 103 to 103. The stopper members 104, 104 are provided at both ends of the front surface 100*a* side (the Y1 side) in the right-left direction X.

As illustrated in FIG. 1A, the image-forming apparatus main body 101 includes a plurality of (four in this example) sheet suppliers 110 to 110 (paper suppliers), an image former 120, an operation acceptor 130 (operation panel), an image reader 140, and a sheet discharger 150. The sheet suppliers 110 to 110 supply the sheet P, such as recording paper, to the image former 120.

The sheet discharger 150 is provided between the image former 120 and the image reader 140. A discharge tray 151 is provided on the top of the image former 120. The sheet supplier 110 is provided below the image former 120. The sheet containers 111 to 114 (sheet feed cassettes) containing the sheets P are removably installed in the sheet suppliers 110 to 110, respectively. In the image-forming apparatus main body 101, the sheets P contained in the sheet containers 111 to 114 are supplied by the sheet supplier 110 to the image former 120, an image is formed by the image former 120 on the supplied sheet, and the sheet having the image formed thereon is discharged into the discharge tray 151 of the sheet discharger 150.

The image-forming apparatus 100 includes the sheet containers 111 to 114 that are placed side by side in the image-forming apparatus main body 101. In the image-forming apparatus main body 101, the sheet containers 111 to 114 are placed side by side in the juxtaposition direction W (in this example, the vertical direction Z).

The image-forming apparatus 100 is configured to allow the sheet containers 111 to 114 to be pulled out of the image-forming apparatus main body 101 in the predetermined pull-out direction S1. Specifically, the image-forming apparatus 100 allows the sheet containers 111 to 114 to be inserted and removed into and from the image-forming apparatus main body 101 in the predetermined insertion/removal direction S (in this example, the front-back direction Y).

In the following description, one sheet container (111 or 112) of the two adjacent sheet containers 111 and 112 may be simply referred to as the one sheet container (111), and the other sheet container (112 or 111) may be simply referred to as the other sheet container (112). One lock member 210 (210A or 210B) of the pair of lock members 210 (210A) and 210 (210B) is simply referred to as the one lock member 210 (210A), and the other lock member 210 (210A or 210B) is simply referred to as the other lock member 210 (210B).

Figure 3:
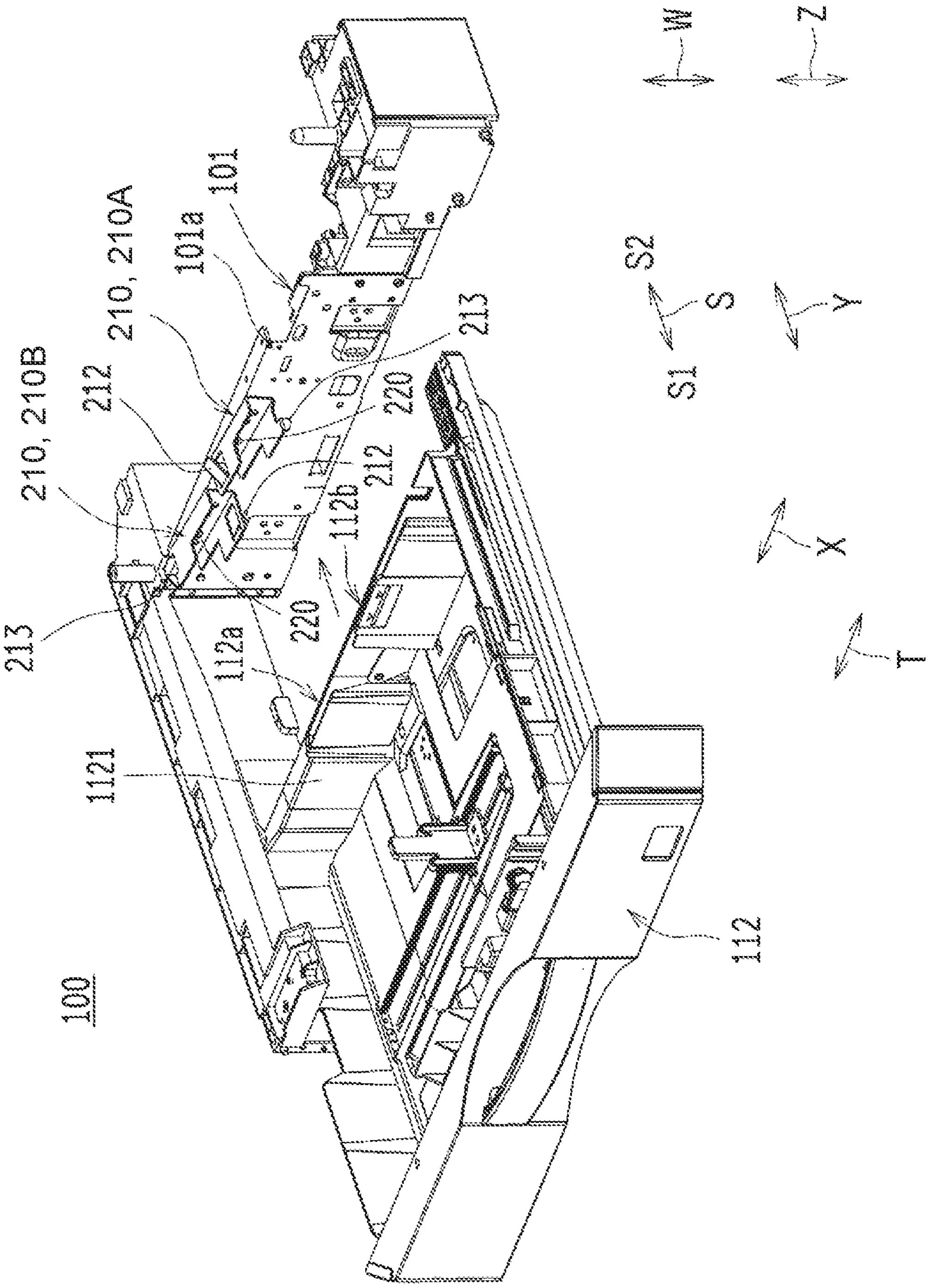
FIG. 3 is a perspective view illustrating the state in the process of inserting the other one of the two adjacent sheet containers in an insertion direction.

FIG. 3 is a perspective view illustrating the state in the process of inserting the other sheet container (112) of the two adjacent sheet containers 111 and 112 in the insertion direction S2.

Figure 4A:
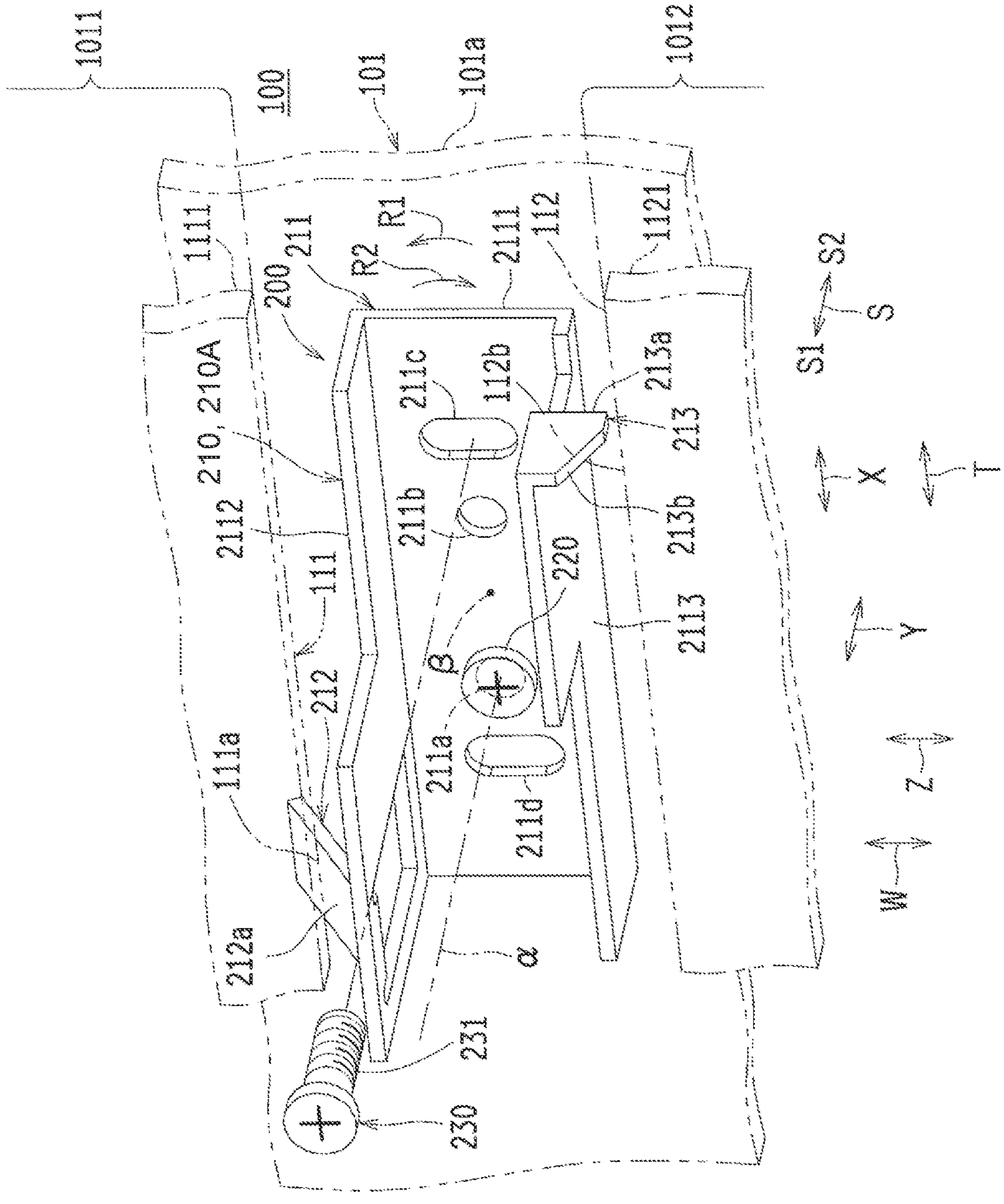
FIG. 4A is a perspective view of one lock member when viewed from below diagonally on the front side.
Figure 4B:
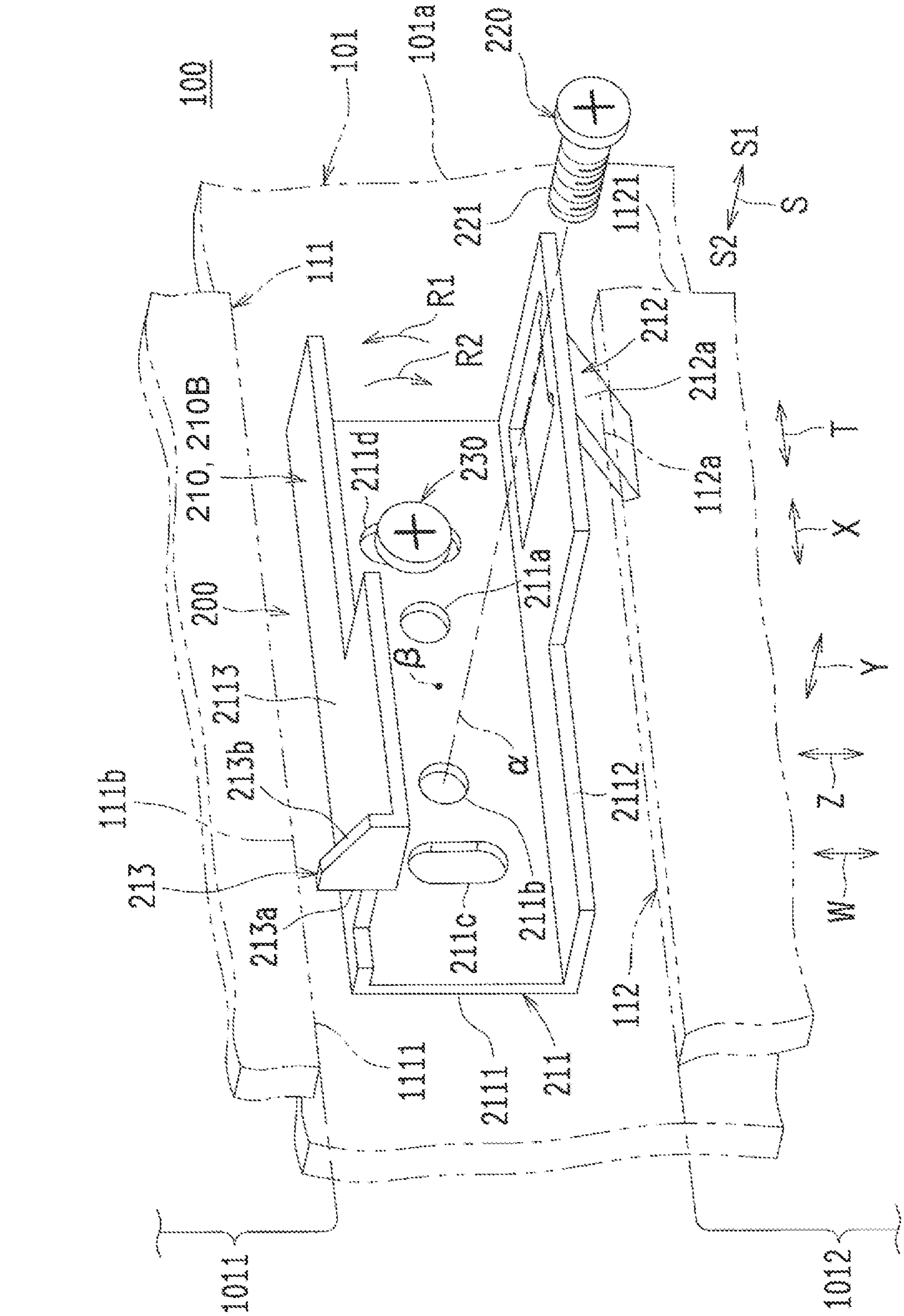
FIG. 4B is a perspective view of the other lock member when viewed from above diagonally on the front side.

FIG. 4A is a perspective view of the one lock member 210 (210A) when viewed from below diagonally on the front side. FIG. 4B is a perspective view of the other lock member 210 (210B) when viewed from above diagonally on the front side. FIGS. 4A and 4B illustrate the state where the two adjacent sheet containers 111 and 112 are both accommodated in the image-forming apparatus main body 101.

Figure 5A:
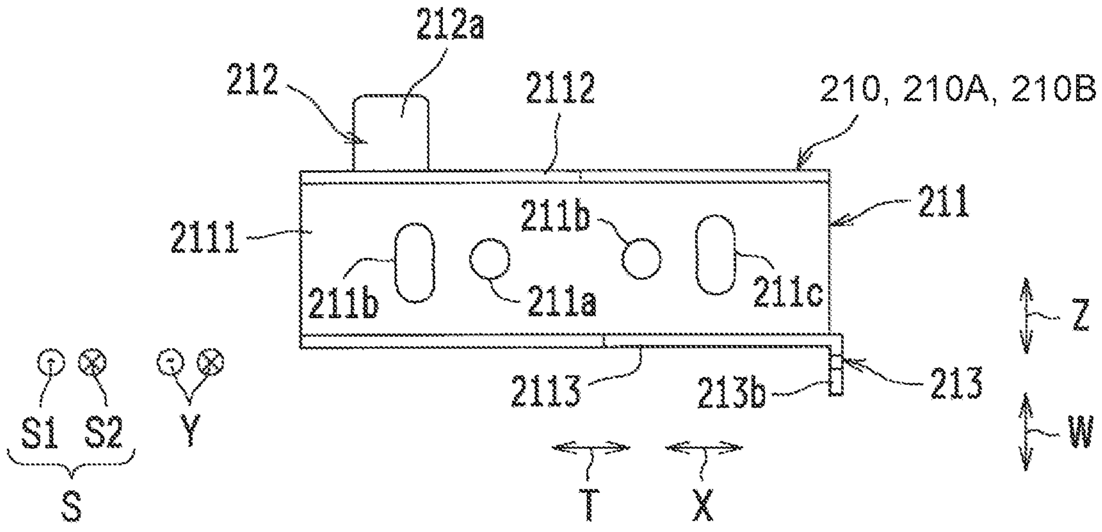
FIG. 5A is a front view illustrating the lock member in an example of a pull-out lock device.
Figure 5B:
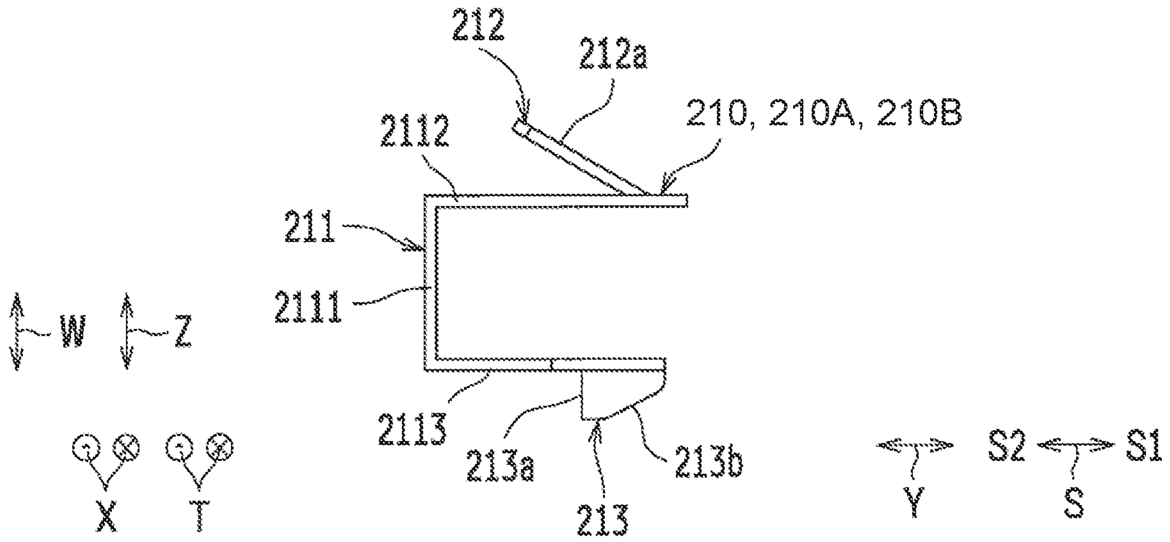
FIG. 5B is a side view illustrating the lock member in an example of the pull-out lock device.
Figure 5C:
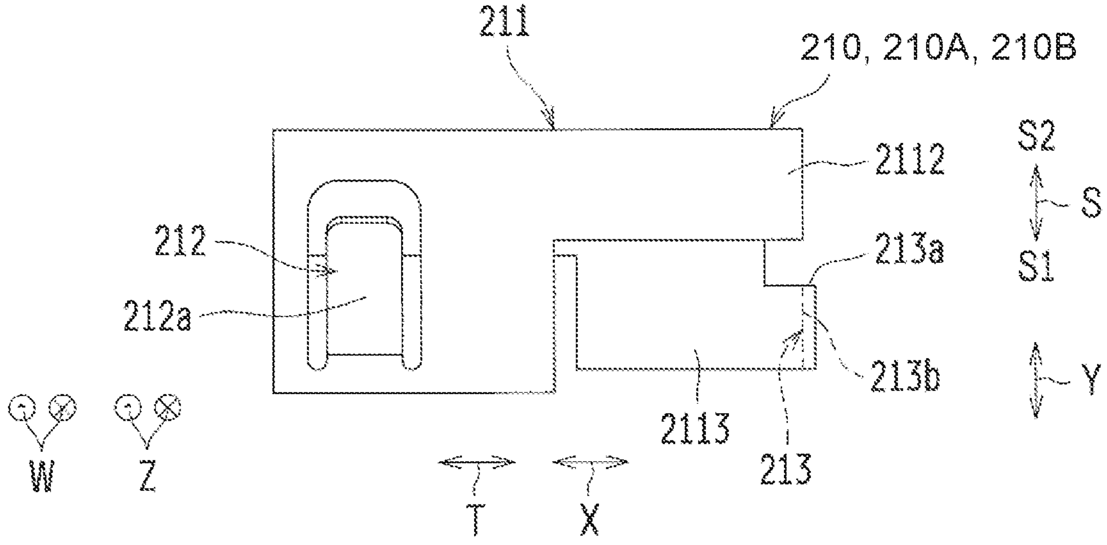
FIG. 5C is a plan view or a bottom view illustrating the lock member in an example of the pull-out lock device.

FIGS. 5A to 5C are a front view, a side view, and a plan view or a bottom view, respectively, illustrating the lock member 210 (210A, 210B) in an example of a pull-out lock device 200. FIGS. 5A to 5C illustrate the one lock member 210 (210A) and the other lock member 210 (210B) in one figure. This also applies to FIGS. 15A to 15C, 16A to 16C, 18A, 18B, and 19A to 19C described below.

Figure 6:
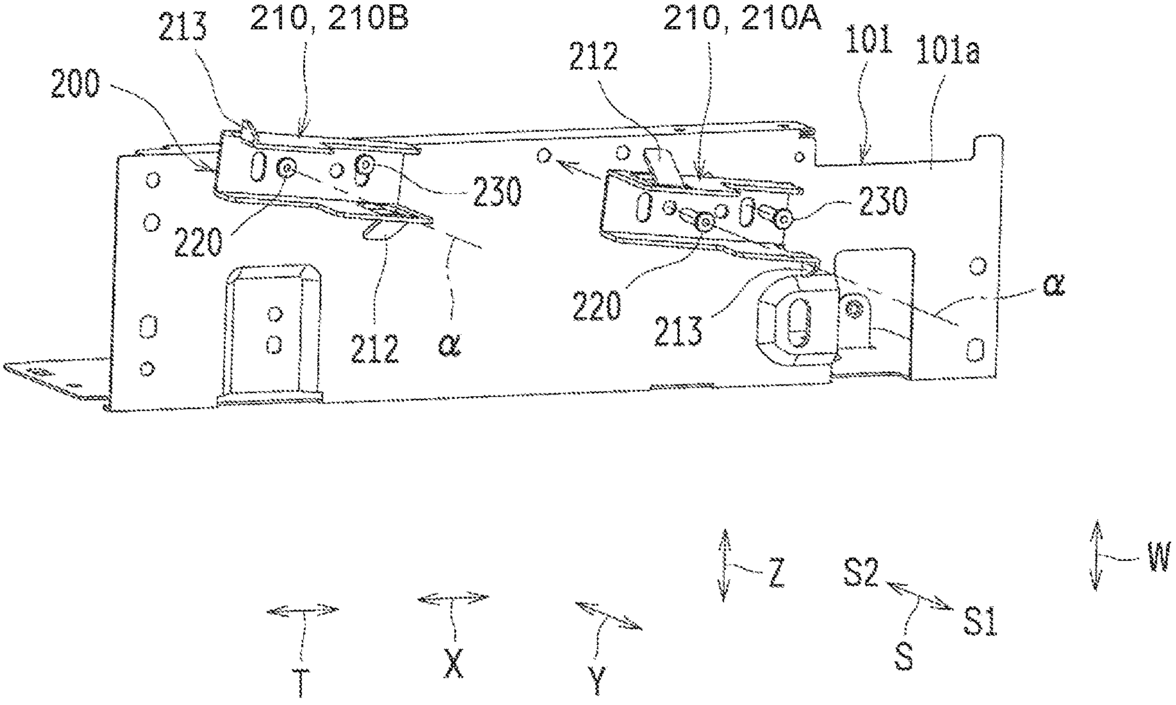
FIG. 6 is an exploded perspective view illustrating the state where the pair of lock members is attached to the image-forming apparatus main body in an example of the pull-out lock device.
Figure 7:
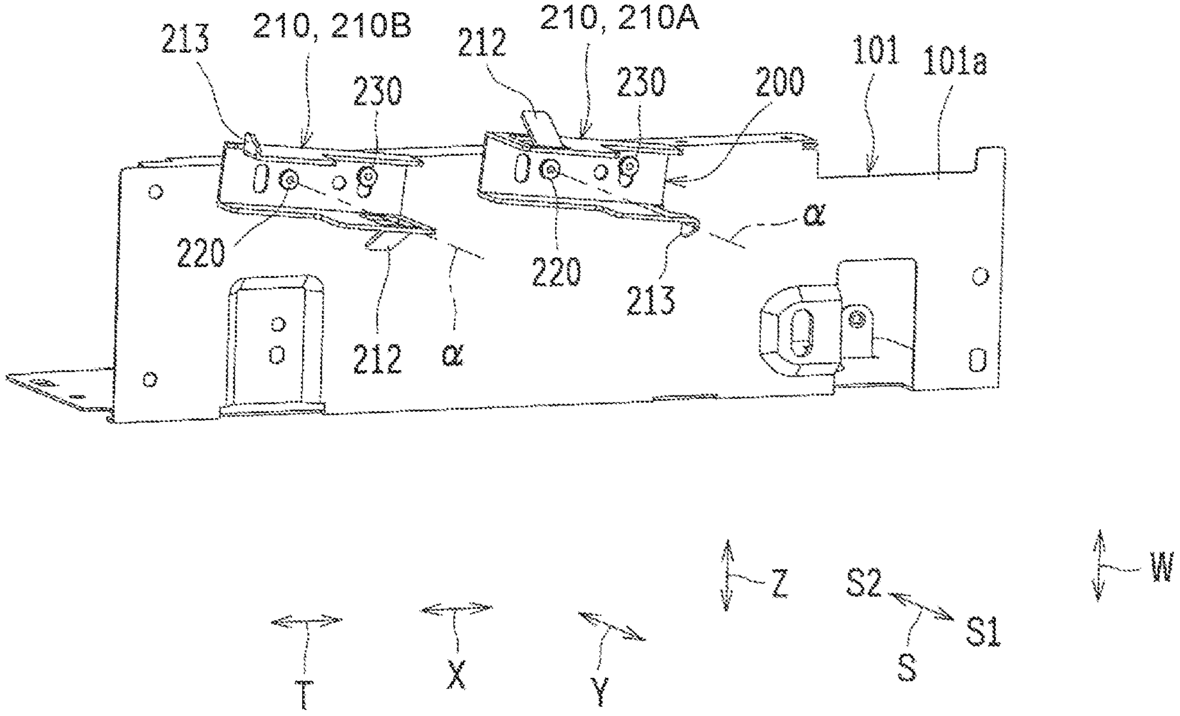
FIG. 7 is a perspective view illustrating the state where the pair of lock members is attached to the image-forming apparatus main body in an example of the pull-out lock device.

FIGS. 6 and 7 are an exploded perspective view and a perspective view, respectively, illustrating the state where the pair of the lock members 210 (210A) and 210 (210B) is attached to the image-forming apparatus main body 101 in an example of the pull-out lock device 200. FIGS. 6 and 7 illustrate the state where the two adjacent sheet containers 111 and 112 are both pulled out of the image-forming apparatus main body 101.

Figure 8:
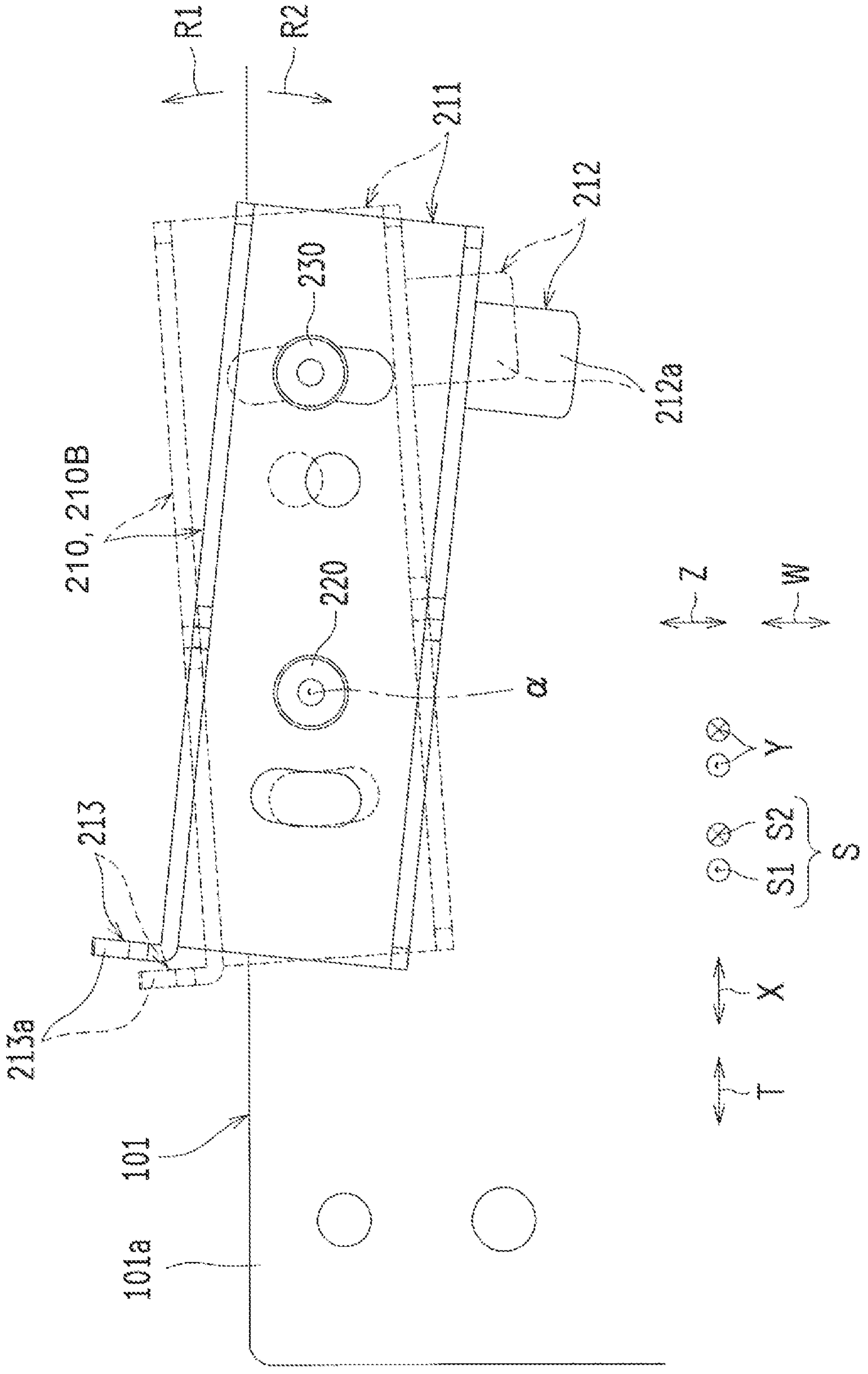
FIG. 8 is a front view illustrating the state where the other lock member rotates around a rotation axis.

FIG. 8 is a front view illustrating the state where the other lock member 210 (210B) rotates around a rotation axis a.

Figure 9A:
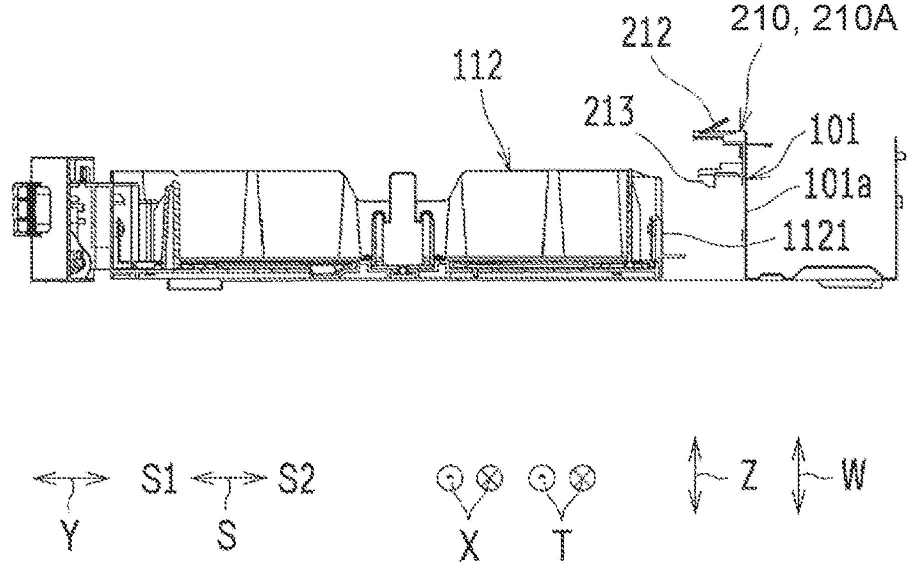
FIG. 9A is a cross-sectional view of the state in the process of inserting the other sheet container into the image-forming apparatus main body in the insertion direction when viewed from the side.
Figure 9B:
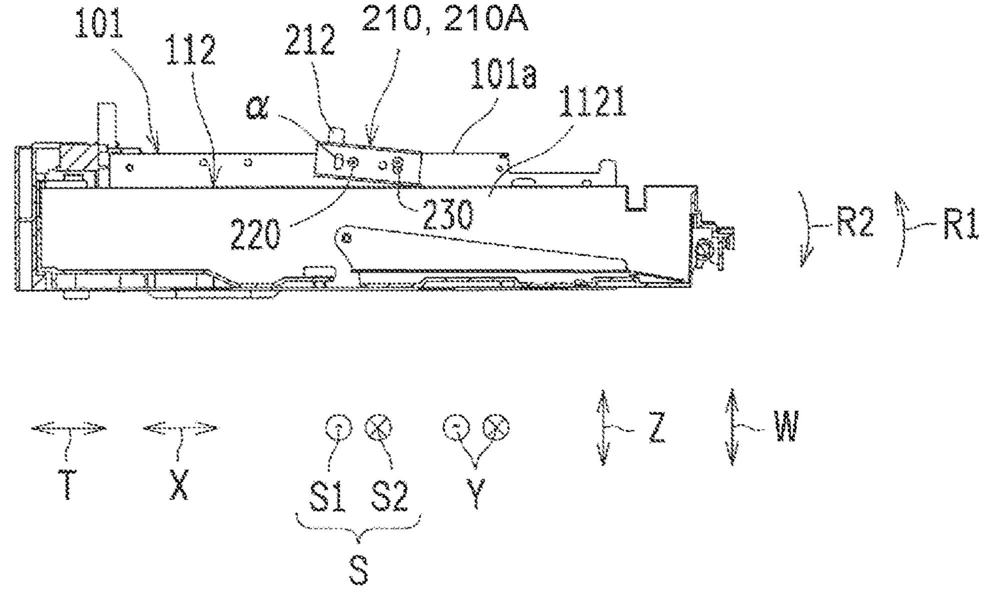
FIG. 9B is a cross-sectional view of the state in the process of inserting the other sheet container into the image-forming apparatus main body in the insertion direction when viewed from the front.

FIGS. 9A and 9B are cross-sectional views of the state in the process of inserting the other sheet container (112) into the image-forming apparatus main body 101 in the insertion direction S2 when viewed from the side and the front, respectively.

Figure 10A:
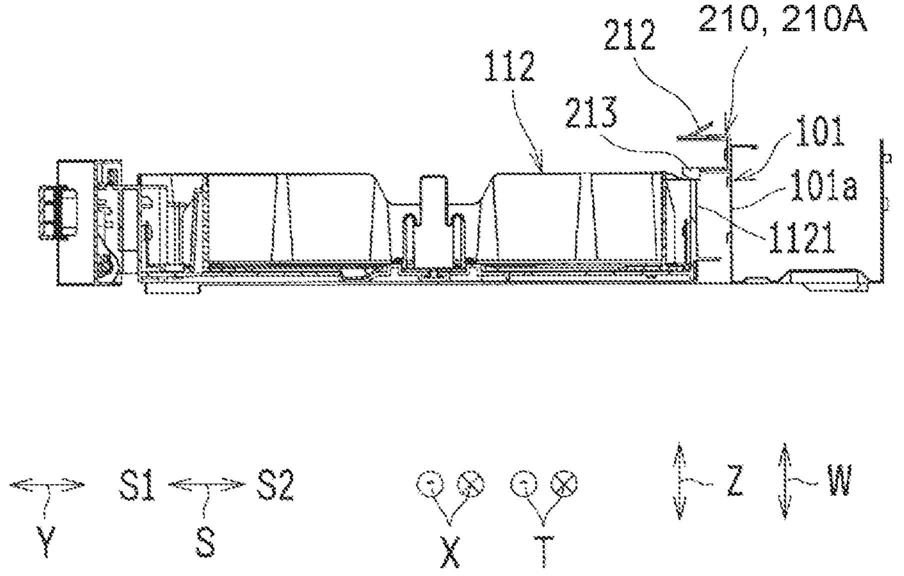
FIG. 10A is a cross-sectional view of the state where the other sheet container is further inserted in the insertion direction after the state illustrated in FIG. 9A to be in contact with a lock of the one lock member when viewed from the side.
Figure 10B:
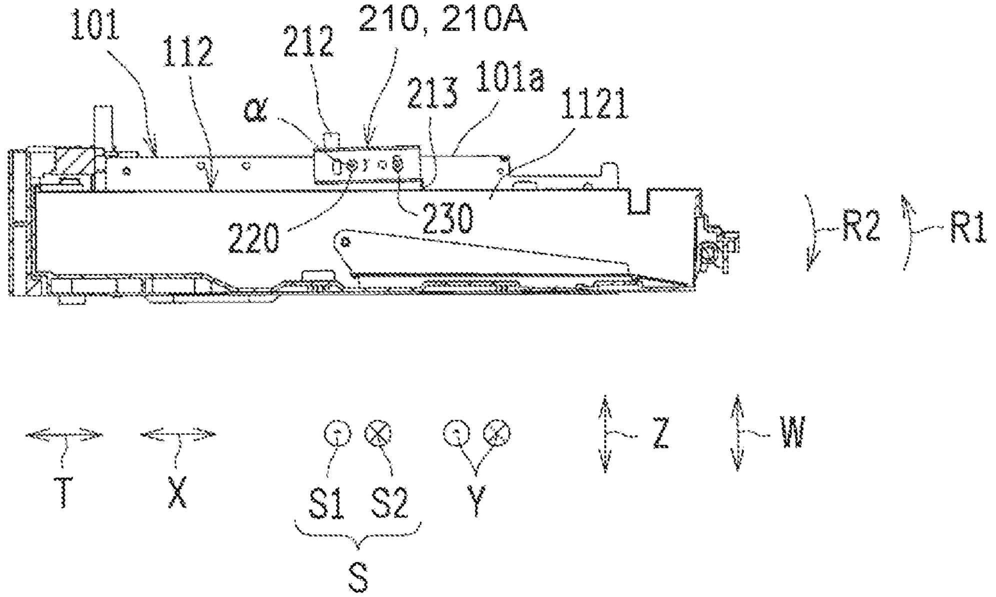
FIG. 10B is a cross-sectional view of the state where the other sheet container is further inserted in the insertion direction after the state illustrated in FIG. 9B to be in contact with the lock of the one lock member when viewed from the front.

FIGS. 10A and 10B are cross-sectional views of the state where the other sheet container (112) is further inserted in the insertion direction S2 after the state illustrated in FIGS. 9A and 9B to be in contact with a lock 213 of the one lock member 210 (210A) when viewed from the side and the front, respectively.

Figure 11A:
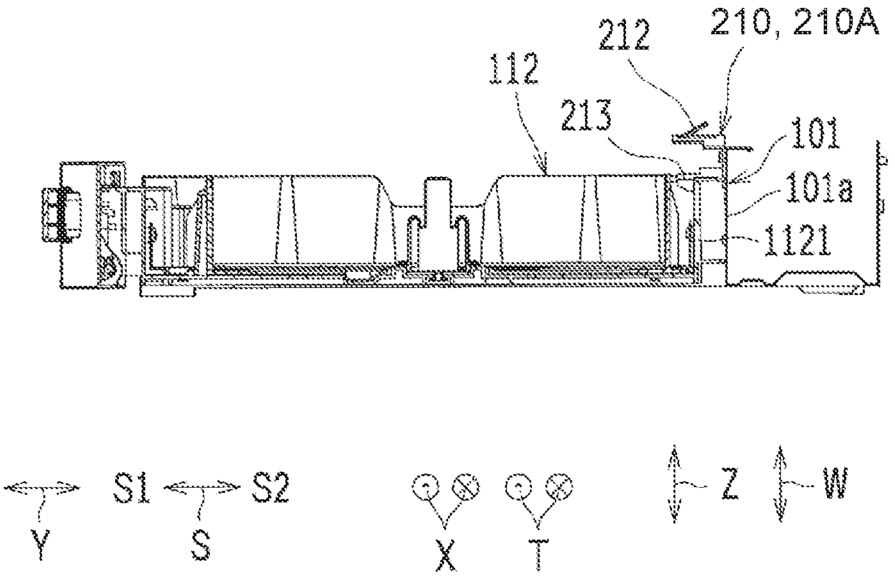
FIG. 11A is a cross-sectional view of the state where the other sheet container is further inserted in the insertion direction after the state illustrated in FIG. 10A to be accommodated in the image-forming apparatus main body when viewed from the side.
Figure 11B:
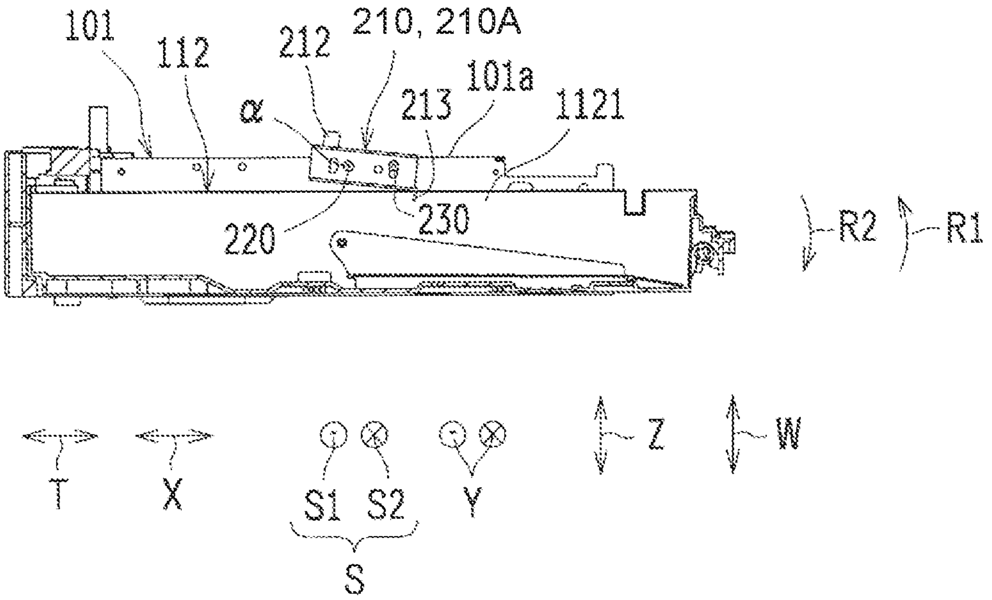
FIG. 11B is a cross-sectional view of the state where the other sheet container is further inserted in the insertion direction after the state illustrated in FIG. 10B to be accommodated in the image-forming apparatus main body when viewed from the front.

FIGS. 11A and 11B are cross-sectional views of the state where the other sheet container (112) is further inserted in the insertion direction S2 after the state illustrated in FIGS. 10A and 10B to be accommodated in the image-forming apparatus main body 101 when viewed from the side and the front, respectively.

Figure 12:
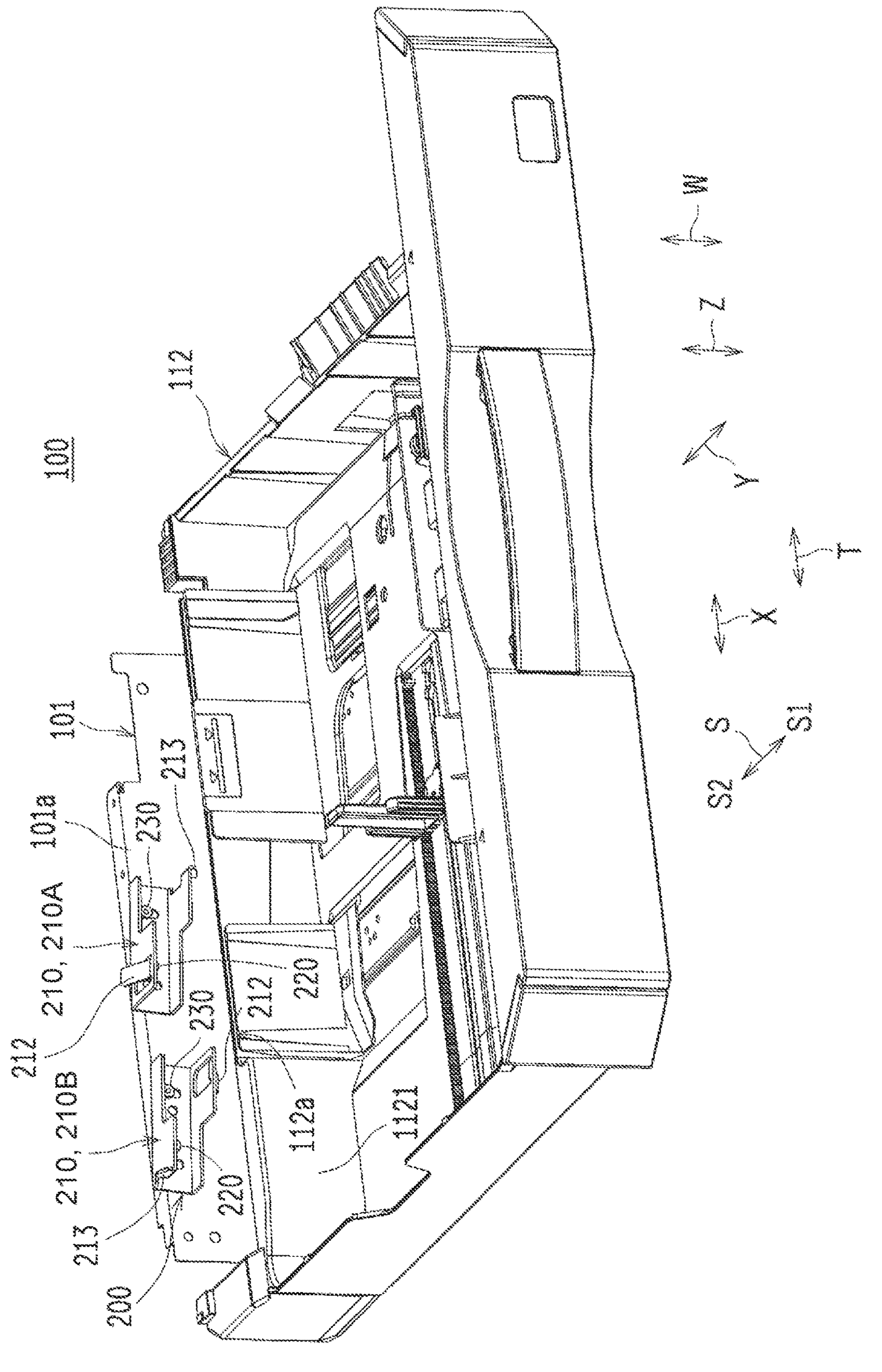
FIG. 12 is a perspective view illustrating the state in the process of inserting the other sheet container into the image-forming apparatus main body in the insertion direction while the one sheet container is pulled out of the image-forming apparatus main body.

FIG. 12 is a perspective view illustrating the state in the process of inserting the other sheet container (112) into the image-forming apparatus main body 101 in the insertion direction S2 while the one sheet container (111) is pulled out of the image-forming apparatus main body 101.

Figure 13:
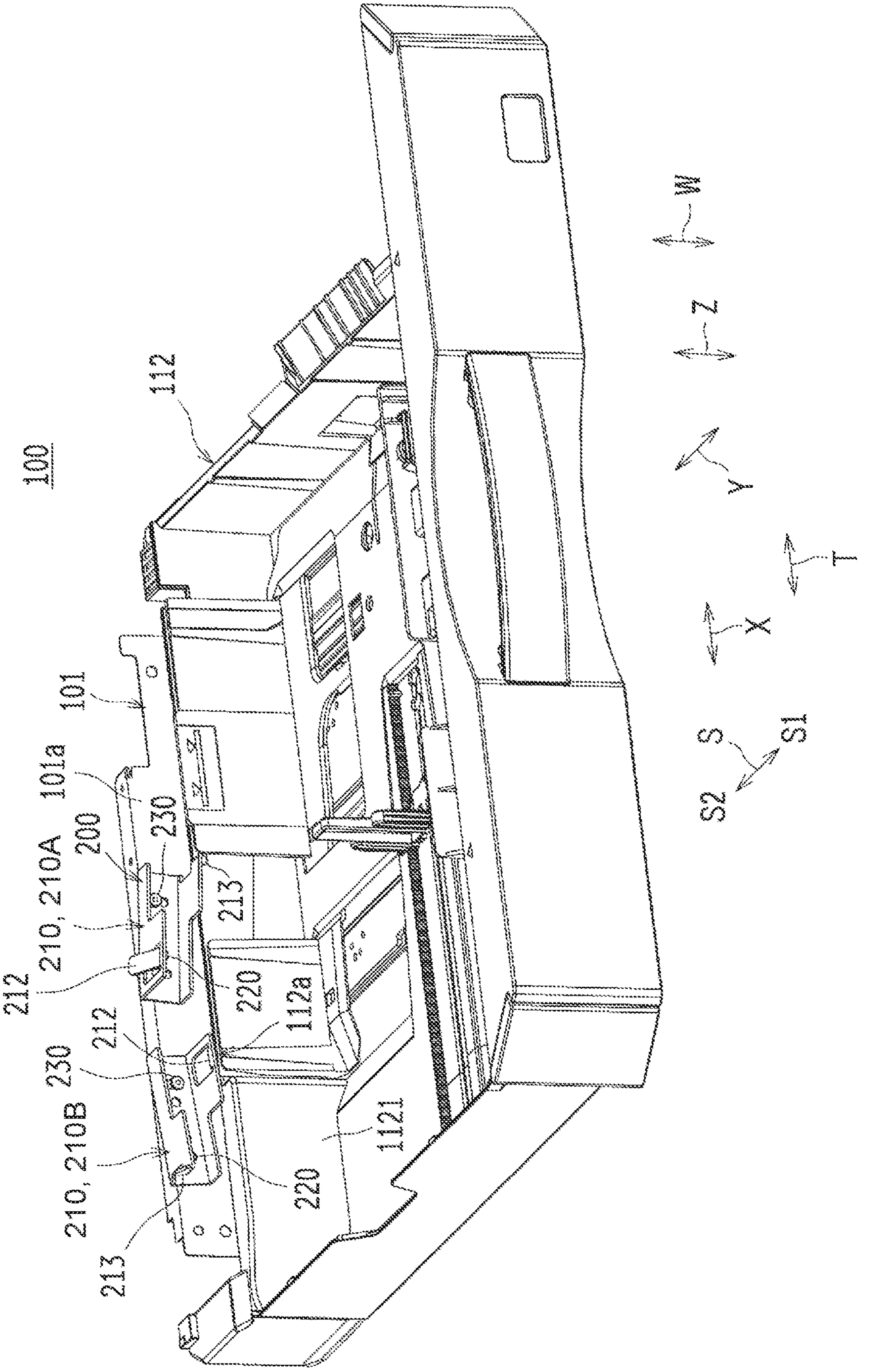
FIG. 13 is a perspective view illustrating the state where the other sheet container is further inserted in the insertion direction after the state illustrated in FIG. 12 to be accommodated in the image-forming apparatus main body.

FIG. 13 is a perspective view illustrating the state where the other sheet container (112) is further inserted in the insertion direction S2 after the state illustrated in FIG. 12 to be accommodated in the image-forming apparatus main body 101.

Figure 14A:
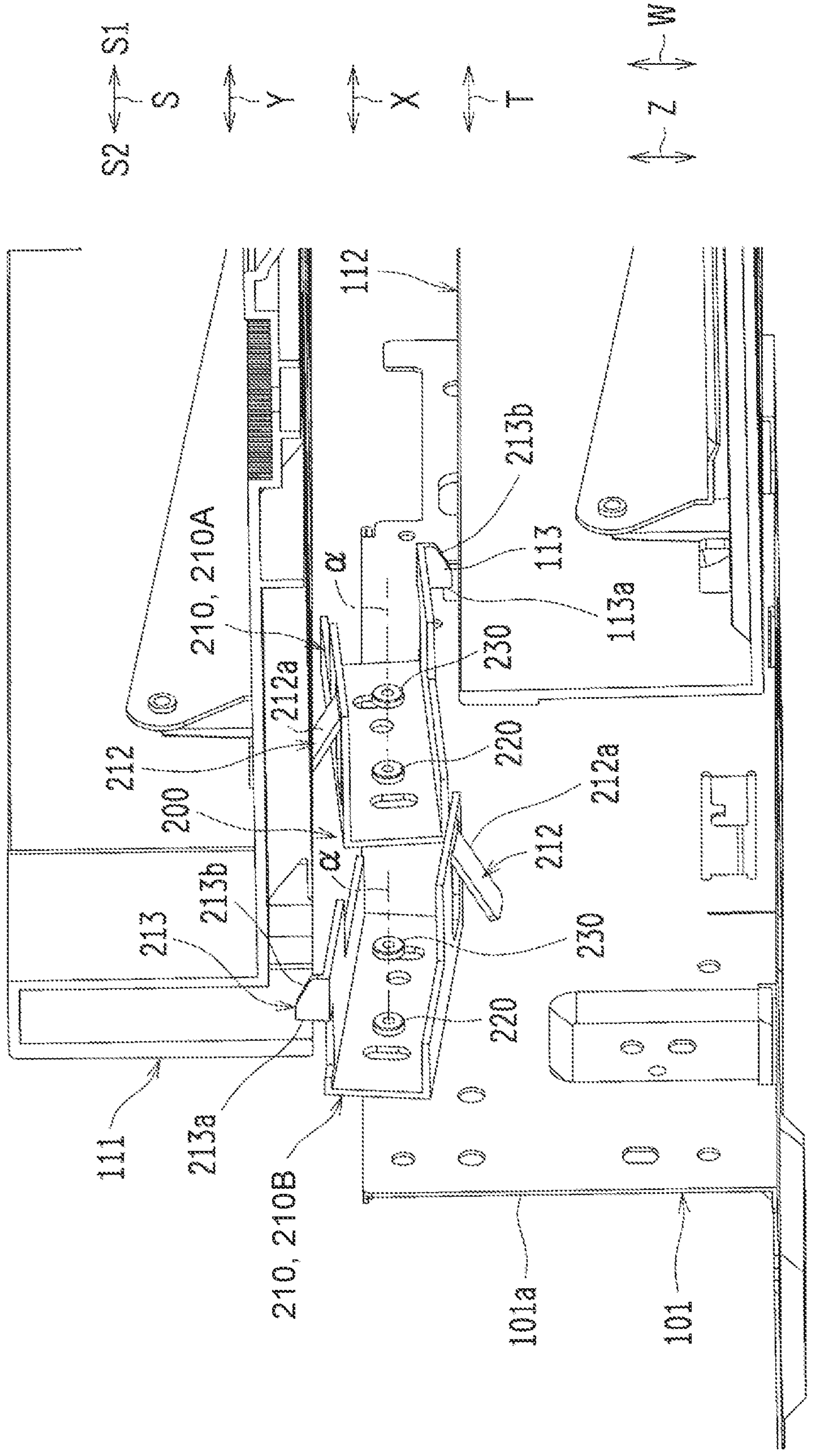
FIG. 14A is an enlarged perspective view illustrating the state where the one sheet container is locked by the other lock member while accommodated in the image-forming apparatus main body when the other sheet container is pulled out of the image-forming apparatus main body.

FIG. 14A is an enlarged perspective view illustrating the state where the one sheet container (111) is locked by the other lock member 210 (210B) while accommodated in the image-forming apparatus main body 101 when the other sheet container (112) is pulled out of the image-forming apparatus main body 101.

Figure 14B:
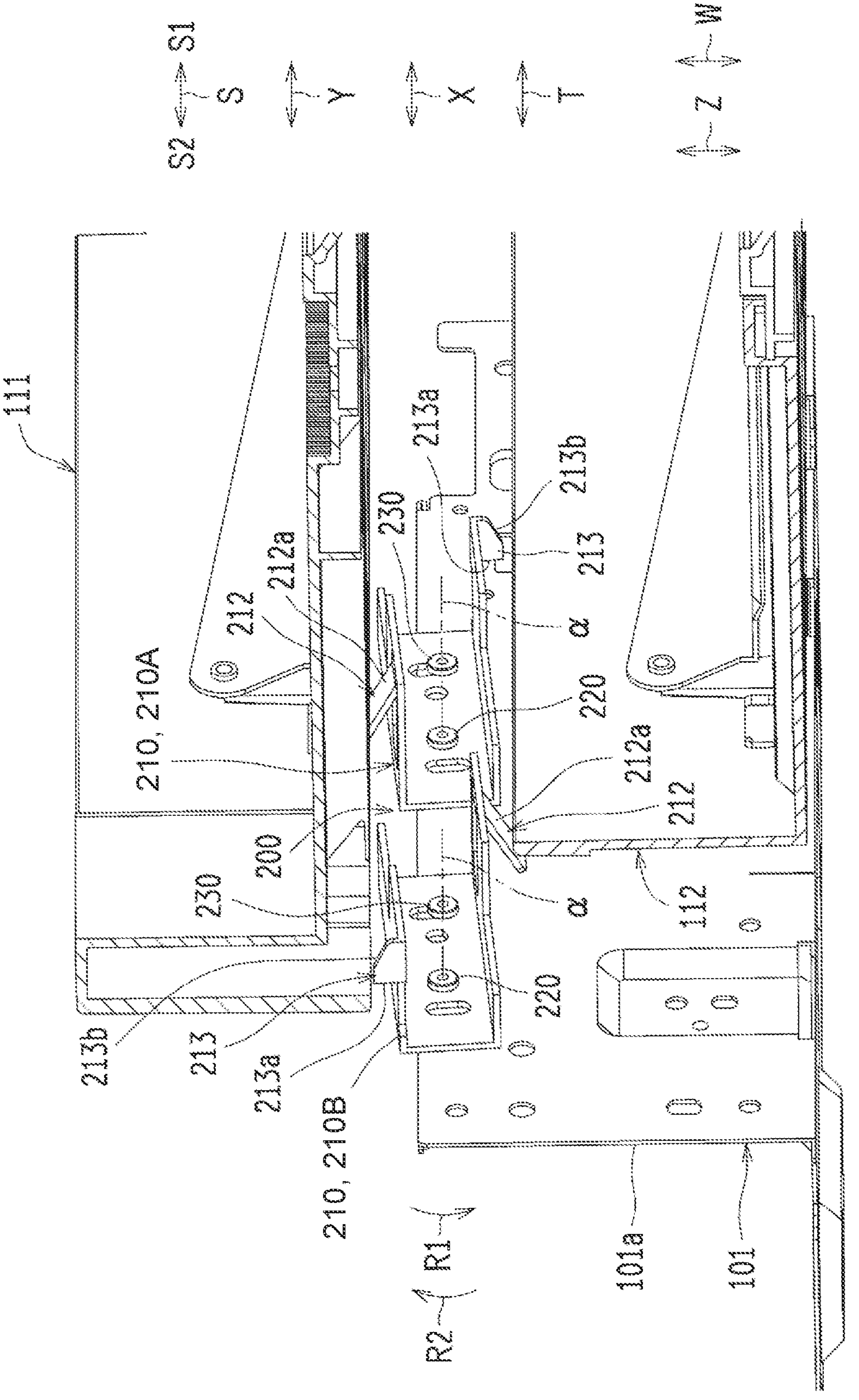
FIG. 14B is a perspective view illustrating the state where the one sheet container is unlocked by the lock of the other lock member when the other sheet container is inserted into the image-forming apparatus main body in the insertion direction after the state illustrated in FIG. 14A to be in contact with a contact member of the other lock member.

FIG. 14B is a perspective view illustrating the state where the one sheet container (111) is unlocked by the lock 213 of the other lock member 210 (210B) when the other sheet container (112) is inserted into the image-forming apparatus main body 101 in the insertion direction S2 after the state illustrated in FIG. 14A to be in contact with the contact member 212 of the other lock member 210 (210B).

Figure 14C:
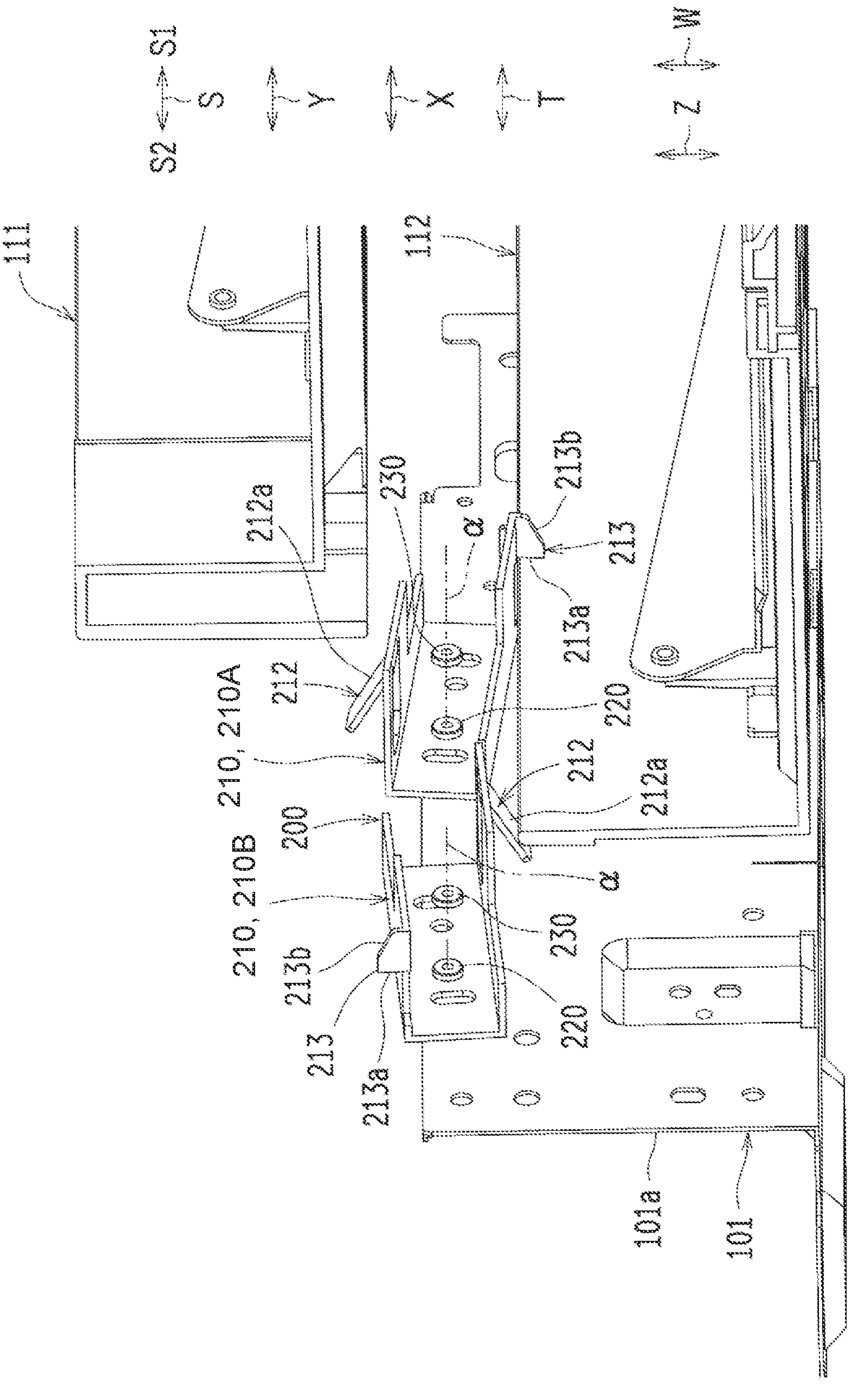
FIG. 14C is a perspective view illustrating the state where the other sheet container is locked by the lock of the one lock member when the one sheet container is pulled out of the image-forming apparatus main body in the state illustrated in FIG. 14B and the contact between the one lock member and the contact member is removed.

FIG. 14C is a perspective view illustrating the state where the other sheet container (112) is locked by the lock 213 of the one lock member 210 (210A) when the one sheet container (111) is pulled out of the image-forming apparatus main body 101 in the state illustrated in FIG. 14B and the contact between the one lock member 210 (210A) and the contact member 212 is removed.

The image-forming apparatus 100 includes the pull-out lock device 200 that is provided in the image-forming apparatus main body 101 that allows the sheet container (111, 112) to be pulled out in the pull-out direction S1.

The sheet containers (111, 112) are capable of loading the sheets P to P, and the sheet containers are placed side by side in the vertical direction Z in the image-forming apparatus main body 101.

The image-forming apparatus 100 includes the pull-out lock device 200 for the two adjacent sheet containers (in this example, the two sheet containers 111 and 112 from the top) (see FIG. 2).

The pull-out lock device 200 includes the lock member 210 including a main body 211 that is attached so as to be rotatable around the rotation axis a relative to the image-forming apparatus main body 101, a rotation member (211*a*, 211*b*, 220) that supports the main body 211 so as to be rotatable around the rotation axis a, the contact member 212, and the lock 213.

In the lock member 210, while the two adjacent sheet containers 111 and 112 among the sheet containers 111 to 114 are both located at an accommodated position in the image-forming apparatus main body 101, the contact member 212 is in contact with the one sheet container (111 or 112) and thus the lock member 210 rotates around the rotation axis a, and the lock 213 moves to an unlock position to allow the other sheet container (112 or 111) to move in the pull-out direction S1. Conversely, in the lock member 210, when the other sheet container (112 or 111) is located at the accommodated position and the one sheet container (111 or 112) is pulled out in the pull-out direction S1 from the accommodated position and the contact between the one sheet container (111 or 112) and the contact member 212 is removed, the lock member 210 rotates around the rotation axis a, and the lock 213 moves to a lock position to prohibit the other sheet container (112 or 111) from moving in the pull-out direction S1.

That is, when either one sheet container (111 or 112) of the two adjacent sheet containers 111 and 112 is pulled out of the image-forming apparatus main body 101, the pull-out lock device 200 prohibits the movement of the other sheet container (112 or 111), which is accommodated in the image-forming apparatus main body 101, in the pull-out direction S1 relative to the image-forming apparatus main body 101.

The pull-out lock device 200 for the sheet container according to the present embodiment includes the lock member 210. The lock member 210 is provided so as to be rotatable around the rotation axis a along the horizontal direction (in this example, the insertion/removal direction S) relative to the image-forming apparatus main body 101. The lock member 210 includes the main body 211 and the contact member 212 and the lock 213 that are provided in the main body 211. In this example, the rotation axis a extends along the insertion/removal direction S.

According to the present embodiment, in the lock member 210, when the two adjacent sheet containers 111 and 112 are both accommodated in the image-forming apparatus main body 101, the contact member 212 is in contact with the one sheet container (111 or 112). At this point, the lock member 210 rotates in an unlock direction R1 toward the unlock position (the positions illustrated in FIGS. 4A and 4B), and thus the lock 213 allows the other sheet container (111 or 112) to move in the pull-out direction S1.

In the lock member 210, when the one sheet container (111 or 112) is pulled out of the image-forming apparatus main body 101 while the other sheet container (112 or 111) is accommodated in the image-forming apparatus main body 101, the contact between the contact member 212 and the one sheet container (111 or 112) is removed. At this point, the lock member 210 rotates in a lock direction R2 toward the lock position, and thus the lock 213 prohibits the other sheet container (112 or 111) from moving in the pull-out direction S1.

Thus, according to the present embodiment, the configuration is simplified by the use of the lock member 210 provided in the image-forming apparatus main body 101 so as to be rotatable around the rotation axis a. Furthermore, the lock member 210 is rotated to the unlock position to allow the other sheet container (112 or 111) to move in the pull-out direction S1, while the lock member 210 is rotated to the lock position to prohibit the other sheet container (112 or 111) from moving in the pull-out direction S1, which results in an easy operation of the lock member 210. Therefore, the pull-out lock device 200 for the sheet containers 111 and 112 may be easily implemented with a simple configuration.

Specifically, the pull-out lock device 200 includes the pair of lock members 210, 210.

In the one lock member 210 (210A) of the pair of lock members 210, 210, while the two adjacent sheet containers 111 and 112 are both accommodated in the image-forming apparatus main body 101, the contact member 212 rotates in contact with the one sheet container (111). At this point, the one lock member 210 (210A) rotates in the unlock direction R1 toward the unlock position. This causes the lock 213 to move to the unlock position to allow the other sheet container (112) to move in the pull-out direction S1.

In the one lock member 210 (210A), the other sheet container (112) is accommodated in the image-forming apparatus main body 101, and the one sheet container (111) is pulled out of the image-forming apparatus main body 101 and the contact between the one sheet container (111) and the contact member 212 is removed. In this state, the one lock member 210 (210A) rotates in the lock direction R2 toward the lock position. This causes the lock 213 to move to the lock position to prohibit the other sheet container (112) from moving in the pull-out direction S1.

In the other lock member 210 (210B), while the two adjacent sheet containers 111 and 112 are both accommodated in the image-forming apparatus main body 101, the contact member 212 rotates in contact with the other sheet container (112). At this point, the other lock member 210 (210B) rotates in the unlock direction R1 toward the unlock position. This causes the lock 213 to move to the unlock position to allow the one sheet container (111) to move in the pull-out direction S1.

Conversely, in the other lock member 210 (210B), while the one sheet container (111) is accommodated in the image-forming apparatus main body 101, the other sheet container (112) is pulled out of the image-forming apparatus main body 101, and the contact between the contact member 212 and the other sheet container (112) is removed. In this state, the other lock member 210 (210B) rotates in the lock direction R2 toward the lock position. This causes the lock 213 to move to the lock position to prohibit the one sheet container (111) from moving in the pull-out direction S1.

Specifically, the pull-out lock device 200 further includes a rotation shaft member 220. As illustrated in FIGS. 4A and 4B, the lock member 210 (210A, 210B) includes a pair of circular through-holes 211*a* and 211*b* into which the rotation shaft member 220 is inserted. The rotation shaft member 220 and the circular through-holes 211*a* and 211*b* constitute the rotation member. The rotation shaft member 220 is a shoulder screw and is inserted into either one of the pair of circular through-holes 211*a* and 211*b*. The pair of circular through-holes 211*a* and 211*b* is formed in a circular shape around the pair of rotation axes a.

In the lock member 210 (210A, 210B), a male screw 221 of the rotation shaft member 220 is inserted into either one of the pair of circular through-holes 211*a* and 211*b* and is engaged with a female screw (not illustrated) provided in a rear surface frame 101*a* of the image-forming apparatus main body 101. This allows the lock member 210 (210A, 210B) to rotate around the rotation axis a with a simple configuration.

The pull-out lock device 200 further includes a restriction member 230 that restricts excessive rotation of the lock member 210 (210A, 210B) around the rotation axis a. The lock member 210 (210A, 210B) includes a pair of elongated through-holes 211*c* and 211*d* into which the restriction member 230 is inserted. The restriction member 230 is a shoulder screw and is inserted into either one of the pair of elongated through-holes 211*c* and 211*d*. The pair of circular through-holes 211*a* and 211*b* is provided between the pair of elongated through-holes 211*c* and 211*d*. The pair of circular through-holes 211*a* and 211*b* and the pair of elongated through-holes 211*c* and 211*d* are placed side by side such that the center points thereof are aligned in a straight line. Of the pair of elongated through-holes 211*c* and 211*d*, the one elongated through-hole 211*c* is formed to include the circular trajectory of the restriction member 230 around the rotation axis a of the one circular through-hole 211*a*, which is a farther one of the pair of circular through-holes 211*a* and 211*d*. The other elongated through-hole 211*d* is formed to include the circular trajectory of the restriction member 230 around the rotation axis a of the other circular through-hole 211*b*, which is a farther one of the pair of circular through-holes 211*a* and 211*b*.

In the lock member 210 (210A, 210B), a male screw 231 of the restriction member 230 is inserted into either one of the pair of elongated through-holes 211*c* and 211*d* and is engaged with a female screw (not illustrated) provided in the rear surface frame 101*a*. This may prevent excessive rotation of the lock member 210 (210A, 210B) around the rotation axis a with a simple configuration.

The contact member 212 includes a first contact surface 212*a* that comes into contact with the one sheet container (111 or 112). Specifically, the first contact surface 212*a* comes into contact with the one sheet container (111 or 112) on the downstream side in the pull-out direction S1.

A contact surface of at least either the contact member 212 or a contact member (111*a* or 112*a*) (see FIGS. 4A and 4B), which comes into contact with the contact member 212, of a wall (1111 or 1121) (in this example, a rear wall) of the one sheet container (111 or 112) is preferably inclined to protrude toward the one sheet container (111 or 112) on the opposite side of the pull-out direction S1. In this case, the lock member 210 may smoothly rotate to the unlock position.

In this regard, according to the present embodiment, the first contact surface 212*a* is inclined to protrude toward the one sheet container (111 or 112) on the opposite side of the pull-out direction S1. Specifically, the first contact surface 212*a* of the contact member 212 is inclined toward the rotation axis a as it is close to the downstream side in the pull-out direction S1.

Thus, the contact member (111*a* or 112*a*) of the wall (1111 or 1121) of the one sheet container (111 or 112) is in contact with the inclined first contact surface 212*a*, and thus the lock member 210 may smoothly rotate to the unlock position. In this case, the contact member (111*a* or 112*a*) of the one sheet container (111 or 112) may include no inclined surface, and thus the lock member 210 may smoothly rotate to the unlock position without modifying the existing sheet container.

Specifically, the contact member 212 is formed by bending from the main body 211. The main body 211 includes a base 2111 and a first plane 2112. The base 2111 is formed along both the juxtaposition direction W and an orthogonal direction T that is orthogonal to both the juxtaposition direction W and the pull-out direction S1. The first plane 2112 connects to the base 2111 along both the pull-out direction S1 and the orthogonal direction T.

The contact member 212 is formed by bending from the first plane 2112 along the orthogonal direction T. In this example, the contact member 212 is formed by diagonally bending from the first plane 2112 along the orthogonal direction T to the contact side with the one sheet container (111 or 112) (the side opposite to the rotation axis a).

Thus, in the lock member 210 (210A, 210B), the contact member 212 and also the first contact surface 212*a* may be formed in an easy and simple way. For example, the main body 211 and the contact member 212 may be easily formed by cutting and bending one sheet of metal.

According to the present embodiment, the lock 213 is provided to protrude from the main body 211 toward the other sheet container (112 or 111). An end of the lock 213 on the opposite side of the pull-out direction S1 includes a lock surface 213*a* that comes into contact with the other sheet container (112 or 111) to prohibit the movement in the pull-out direction S1. Specifically, the lock surface 213*a* comes into contact with the other sheet container (112 or 111) on the upstream side in the pull-out direction S1 to prohibit the other sheet container (112 or 111) from moving in the pull-out direction S1.

Thus, it is possible to ensure that the lock surface 213*a* comes into contact with the other sheet container (112 or 111). Thus, it is possible to ensure that the lock 213 prohibits the other sheet container (112 or 111) from moving in the pull-out direction S1.

Specifically, the lock 213 is formed by bending from the main body 211. The main body 211 further includes a second plane 2113. The second plane 2113 connects to the base 2111 along both the pull-out direction S1 and the orthogonal direction T.

The lock 213 is formed by bending from the second plane 2113 along the pull-out direction S1. In this example, the lock 213 is formed by bending at a right angle or substantially a right angle from the second plane 2113 along the insertion/removal direction S to the lock side with the other sheet container (112 or 111) (the side opposite to the rotation axis a).

Thus, in the lock member 210 (210A, 210B), the lock 213 and also the lock surface 213*a* may be formed in an easy and simple way. For example, the main body 211 and the lock 213 may be easily formed by cutting and bending one sheet of metal.

According to the present embodiment, the lock member 210 is provided in the rear surface frame 101*a* of the image-forming apparatus main body 101 located at the position corresponding to the end of the sheet containers 111 to 114 accommodated in the image-forming apparatus main body 101 on the opposite side of the pull-out direction S1. In other words, the lock member 210 is provided in the rear surface frame 101*a* of the image-forming apparatus main body 101 on the upstream side in the pull-out direction S1 from the sheet containers 111 to 114 accommodated in the image-forming apparatus main body 101.

Therefore, the lock member 210 may be installed in a space on the upstream side in the pull-out direction S1 from the sheet containers 111 to 114 accommodated in the image-forming apparatus main body 101, and thus a free space on the side of the rear surface in the image-forming apparatus main body 101 may be efficiently used.

Specifically, the first plane 2112 and the second plane 2113 are provided in the base 2111 such that they face each other. The contact member 212 and the lock 213 are provided in the first plane 2112 and the second plane 2113, respectively, to protrude in opposite directions from each other along the juxtaposition direction W.

According to the present embodiment, the contact member 212 is provided at one end of the main body 211. The lock 213 is provided at the other end on the opposite side of the contact member 212 with the rotation member (211*a*, 211*b*, 220) interposed therebetween in the main body 211. Specifically, the lock 213 is provided at the end on the opposite side of the contact member 212 with the rotation axis a (the rotation shaft member 220) interposed therebetween in the main body 211.

In this manner, the contact member 212 and the lock 213 are provided with the rotation axis a interposed therebetween, and therefore the contact between the contact member 212 and the one sheet container (111 or 112) causes a rotation so as to make a movement from the position of the other sheet container (112 or 111) toward the one sheet container (111 or 112). That is, the lock member 210 may move from the lock position to the unlock position. Thus, it is possible to ensure the rotational operation of the lock member 210 in contact with the one sheet container (111 or 112) by the contact member 212 and the rotational operation of the lock member 210 to prohibit the other sheet container (112 or 111) from moving in the pull-out direction S1 by the lock 213 provided on the opposite side of the contact member 212.

In a case where a position of a center of gravity 8 (see FIGS. 4A and 4B) of the lock member 210 is located at a position corresponding to the rotation axis a in the horizontal direction (X, Y) while the other sheet container (112 or 111) is accommodated in the image-forming apparatus main body 101, it is difficult to rotate the lock member 210 to the lock position in this state even when the one sheet container (111 or 112) is pulled out of the image-forming apparatus main body 101 and the contact between the contact member 212 and the one sheet container (111 or 112) is removed while the other sheet container (111 or 112) is accommodated in the image-forming apparatus main body 101. For this reason, there is a need to use for example a biasing member such as a spring to rotate the lock member 210 to the lock position.

In this regard, according to the present embodiment, the position of the center of gravity 8 of the lock member 210 is located at a different position from the rotation axis a in the horizontal direction (the right-left direction X) while the other sheet container (112 or 111) is accommodated in the image-forming apparatus main body 101. Specifically, when the contact member 212 comes into contact with the lower sheet container 112 of the adjacent sheet containers 111 and 112, the main body 211 is attached to the image-forming apparatus main body 101 such that the rotation member (211*a*, 211*b*, 220) is located on the lock 213 side from the position of the center of gravity 8 of the lock member 210. When the contact member 212 comes into contact with the upper sheet container 111 of the adjacent sheet containers 111 and 112, the main body 211 is attached to the image-forming apparatus main body 101 such that the rotation member (211*a*, 211*b*, 220) is located on the contact member 212 side from the position of the center of gravity 8 of the lock member 210.

Thus, when the contact member 212 is separated from the sheet containers 111 and 112, the lock member 210 may rotate under its own weight and move to the lock position. Therefore, when the one sheet container (111 or 112) is pulled out of the image-forming apparatus main body 101 and the contact between the contact member 212 and the one sheet container (111 or 112) is removed, the lock member 210 may rotate to the lock position under its own weight. This allows the lock member 210 to rotate to the lock position with a simple configuration without using a biasing member such as a spring.

According to the present embodiment, in the lock member 210, while the two adjacent sheet containers 111 and 112 are both accommodated in the image-forming apparatus main body 101, the contact member 212 is in contact with the one sheet container (111 or 112) while protruding from one pull-out path (1011 or 1012) (see FIGS. 1B, 4A, and 4B) of the one sheet container (111 or 112) of the image-forming apparatus main body 101. At this point, the lock member 210 rotates to the unlock position. Accordingly, in the lock member 210, the lock 213 retracts from the other pull-out path (1012 or 1011) of the other sheet container (112 or 111) in the image-forming apparatus main body 101 to allow the other sheet container (112 or 111) to move in the pull-out direction S1.

Conversely, in the lock member 210, when the one sheet container (111 or 112) is pulled out of the image-forming apparatus main body 101 while the other sheet container (112 or 111) is accommodated in the image-forming apparatus main body 101, the contact between the contact member 212 and the one sheet container (111 or 112) in the one pull-out path (1011 or 1012) is removed. At this point, the lock member 210 rotates to the lock position. Accordingly, the lock 213 protrudes into the other pull-out path (1012 or 1011) to prohibit the other sheet container (112 or 111) from moving in the pull-out direction S1.

Thus, it is possible to ensure that the lock 213, which protrudes into the other pull-out path (1012 or 1011) when the lock member 210 rotates to the lock position, prevents the other sheet container (112 or 111) from moving in the pull-out direction S1. Accordingly, it is possible to effectively prohibit the other sheet container (112 or 111) from moving in the pull-out direction S1.

A contact surface of at least either the lock 213 or a contact member (112*b* or 111*b*) (see FIGS. 4A and 4B), which comes into contact with the lock 213, of the other sheet container (112 or 111) is preferably inclined in a direction away from the other sheet container (112 or 111) toward the pull-out direction S1. In this case, the other sheet container (112 or 111) may be smoothly accommodated in the image-forming apparatus main body 101.

In this regard, according to the present embodiment, a side end of the lock 213 in the pull-out direction S1 includes a second contact surface 213*b* that is inclined in a direction away from the other sheet container (112 or 111) toward the pull-out direction S1. Specifically, the second contact surface 213*b* comes into contact with the other sheet container (112 or 111) on the downstream side in the pull-out direction S1. The second contact surface 213*b* is inclined toward the rotation axis a as it is close to the downstream side in the pull-out direction S1.

This allows a smooth operation when the sheet containers 111 and 112 are accommodated in the image-forming apparatus main body 101. Specifically, the contact member (112*b* or 111*b*) of the wall (1121 or 1111) in the other sheet container (112 or 111) comes into contact with the inclined second contact surface 213*b*, and thus the other sheet container (112 or 111) may be smoothly accommodated in the image-forming apparatus main body 101. In this case, the contact member (112*b*, 111*b*) of the other sheet container (112 or 111) may include no inclined surface, and thus the other sheet container (112 or 111) may be smoothly accommodated in the image-forming apparatus main body 101 without modifying the existing sheet container.

Second Embodiment

Figure 15A:
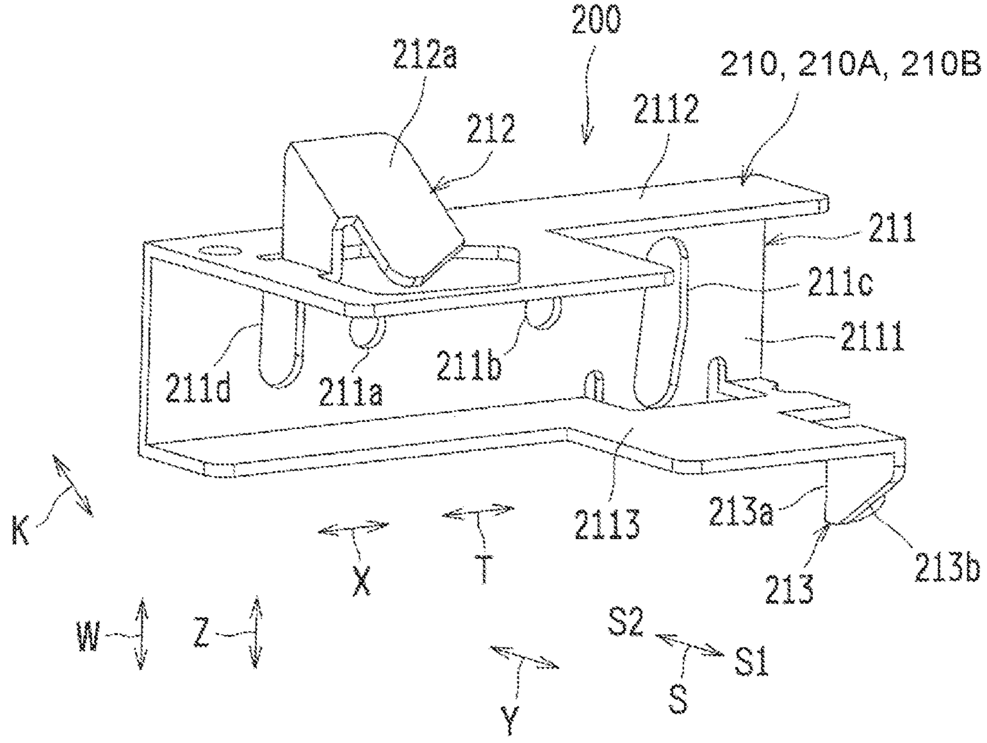
FIG. 15A is a perspective view of an example of the lock member in the pull-out lock device according to a second embodiment when viewed from above diagonally or from below diagonally.
Figure 15B:
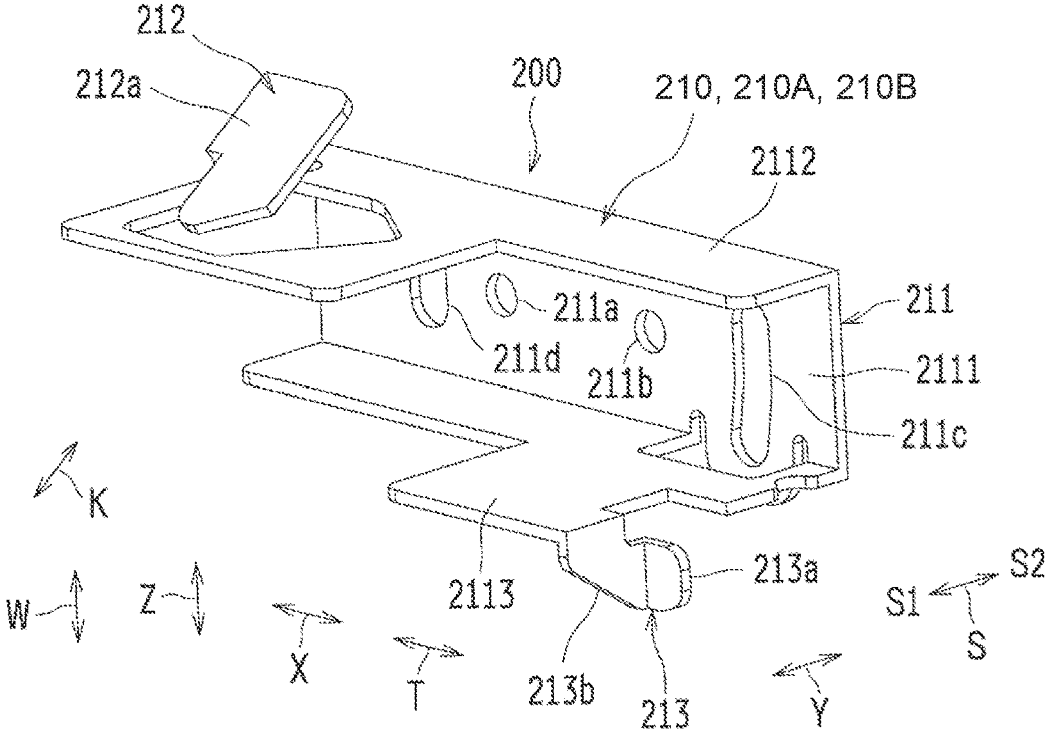
FIG. 15B is a perspective view of an example of the lock member in the pull-out lock device according to the second embodiment when viewed from above diagonally or from below diagonally.
Figure 15C:
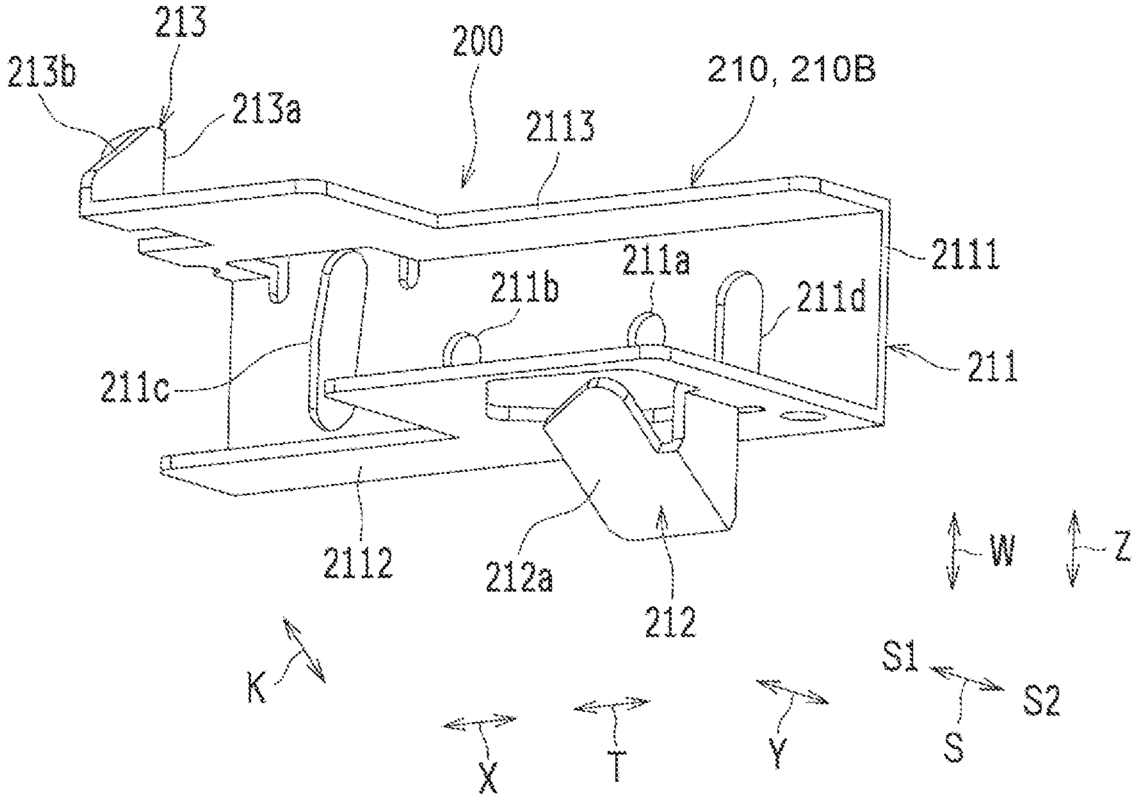
FIG. 15C is a perspective view of an example of the lock member in the pull-out lock device according to the second embodiment when viewed from below diagonally or from above diagonally.

FIGS. 15A and 15B are perspective views of an example of the lock member 210 (210A, 210B) in the pull-out lock device 200 according to a second embodiment when viewed from above diagonally or from below diagonally. FIG. 15C is a perspective view of an example of the lock member 210 (210A, 210B) in the pull-out lock device 200 according to the second embodiment when viewed from below diagonally or from above diagonally.

Figure 16A:
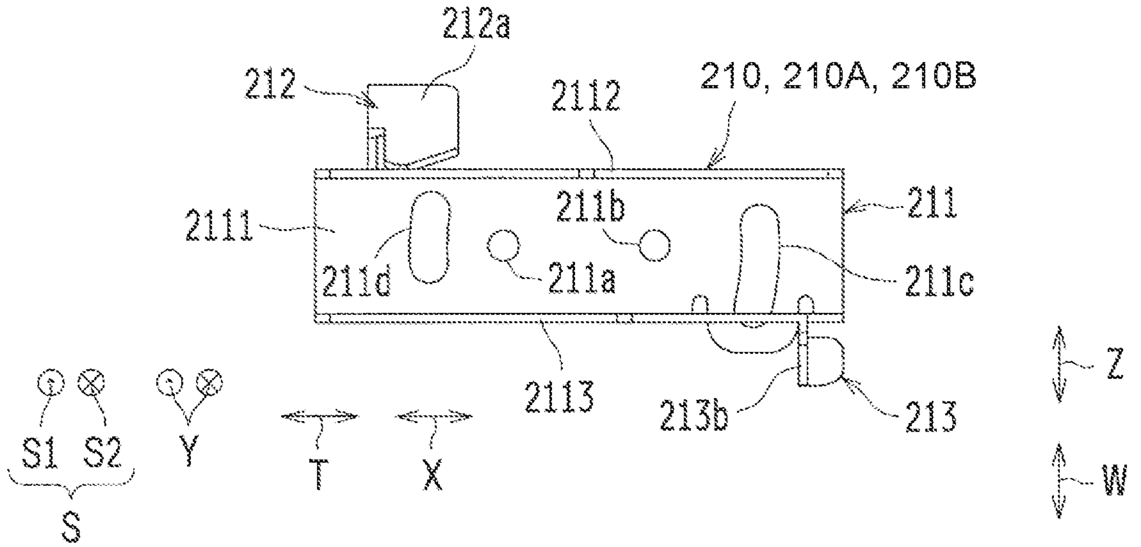
FIG. 16A is a front view of the lock member illustrated in FIGS. 15A to 15C.
Figure 16B:
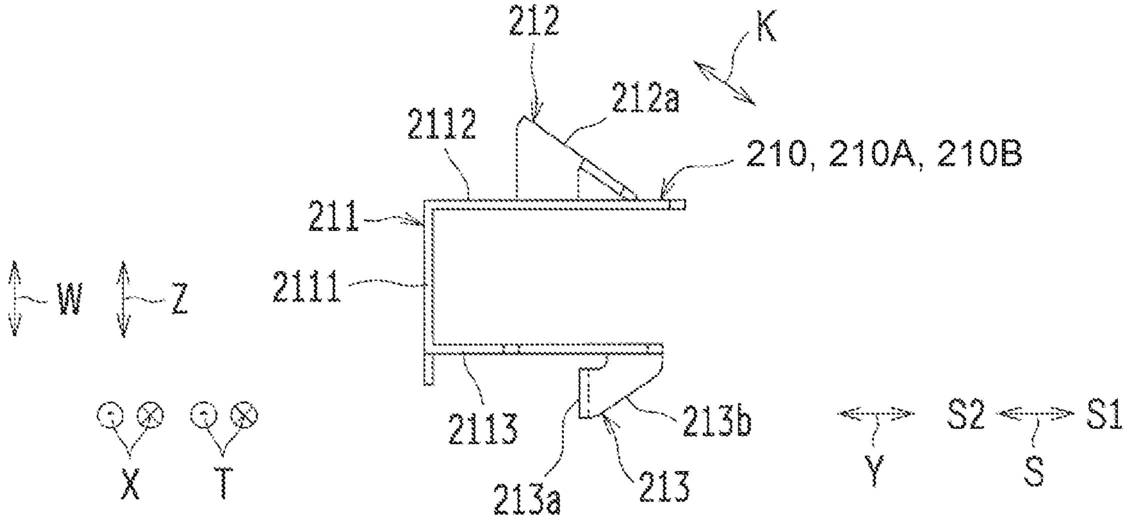
FIG. 16B is a side view of the lock member illustrated in FIGS. 15A to 15C.
Figure 16C:
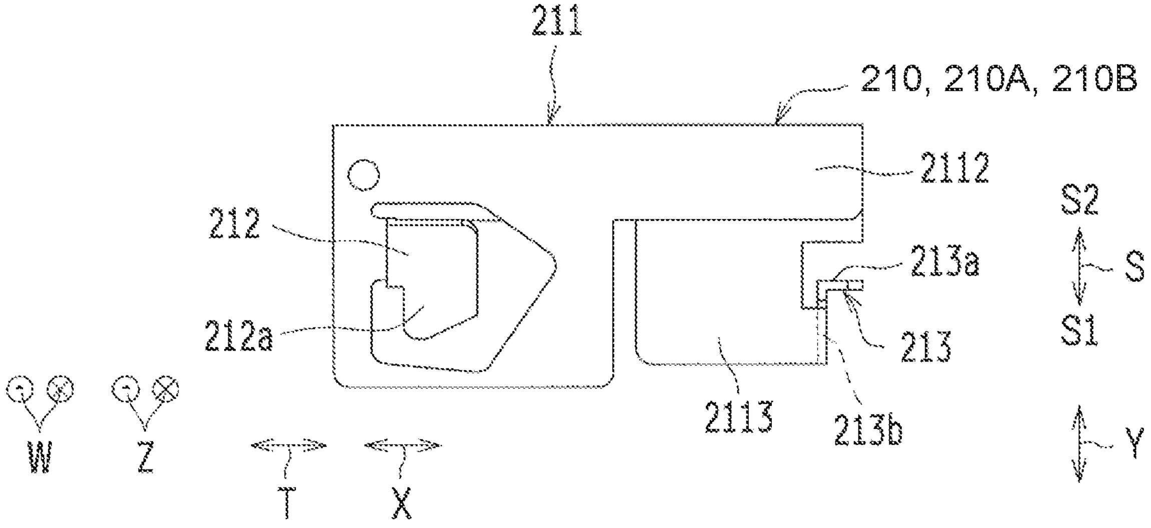
FIG. 16C is a plan view or a bottom view of the lock member illustrated in FIGS. 15A to 15C.

FIGS. 16A to 16C are a front view, a side view, and a plan view or a bottom view, respectively, of the lock member 210 (210A, 210B) illustrated in FIGS. 15A to 15C.

In the pull-out lock device 200 according to the second embodiment, the same configuration as that of the pull-out lock device 200 according to the first embodiment is denoted by the same reference numeral, and the description thereof is omitted.

The smaller the area of the first contact surface 212*a* of the contact member 212, which comes into contact with the one sheet container (111 or 112), the easier the inclination changes due to the force received when the one sheet container (111 or 112) comes into contact with the contact member 212.

In this regard, as illustrated in FIGS. 15A to 16C, the contact member 212 is formed by bending from the first plane 2112 along the pull-out direction S1 and further bending along an inclination direction K that intersects with both the juxtaposition direction W and the pull-out direction S1. In this example, the contact member 212 is formed by bending from the first plane 2112 along the insertion/removal direction S to the contact side with the one sheet container (111 or 112) (the opposite side of the rotation axis a) and further bending inward along the inclination direction K.

This makes it possible to increase the area of the first contact surface 212*a* of the contact member 212, which comes into contact with the one sheet container (111 or 112). Therefore, it may be difficult to change the inclination due to the force received when the one sheet container (111 or 112) comes into contact with the contact member 212.

The smaller the area of the lock surface 213*a* of the lock 213, which comes into contact with the other sheet container (112 or 111), the more the impact force of the lock surface 213*a* is concentrated where the other sheet container (112 or 111) comes into contact with the lock 213, which results in a disadvantage such as a damage to the other sheet container (112 or 111).

In this regard, as illustrated in FIGS. 15A to 16C, the lock 213 is formed by bending from the second plane 2113 along the pull-out direction S1 and further bending along the juxtaposition direction W. In this example, the lock 213 is formed by bending from the second plane 2113 along the insertion/removal direction S to the lock side with the other sheet container (112 or 111) (the opposite side of the rotation axis a) and further bending outward along the juxtaposition direction W.

This makes it possible to increase the area of the lock surface 213*a* of the lock 213, which comes into contact with the other sheet container (112 or 111). Therefore, the impact force of the lock surface 213*a* where the other sheet container (112 or 111) comes into contact with the lock 213 may be distributed, and thus a damage to the other sheet container may be prevented.

The higher the position of the sheet container to be pulled out among the sheet containers 111 to 114, the more likely the center of gravity of the image-forming apparatus 100 is to shift to the pull-out side of the sheet containers 111 to 114, which easily causes an unstable installation state of the image-forming apparatus 100.

In this regard, according to the present embodiment, the lock member 210 (210A, 210B) is provided between a first sheet container (111), which is located at the highest position among the sheet containers 111 to 114, and a second sheet container (112), which is located at the second highest position.

Thus, either one of the first sheet container (111), which is located at the highest position, and the second sheet container (112), which is located at the second highest position, may be prohibited from being pulled out. Accordingly, it may be unlikely that the center of gravity of the image-forming apparatus 100 shifts to the pull-out side of the sheet containers 111 to 114 and that the installation state of the image-forming apparatus 100 becomes unstable.

According to the present embodiment, in the pair of lock members 210 (210A) and 210 (210B), the one lock member 210 (210A) and the other lock member 210 (210B) are formed to have the identical shape. The one lock member 210 (210A) and the other lock member 210 (210B) are provided so as to be rotatable around the rotation axis a (the rotation shaft member 220) relative to the image-forming apparatus main body 101 such that the contact members 212, 212 and the locks 213, 213 thereof are set in opposite positions (alternately).

This enables a shared use of the one lock member 210 (210A) and the other lock member 210 (210B), which achieves a reduction in component costs and component management costs.

Third Embodiment

Figure 17A:
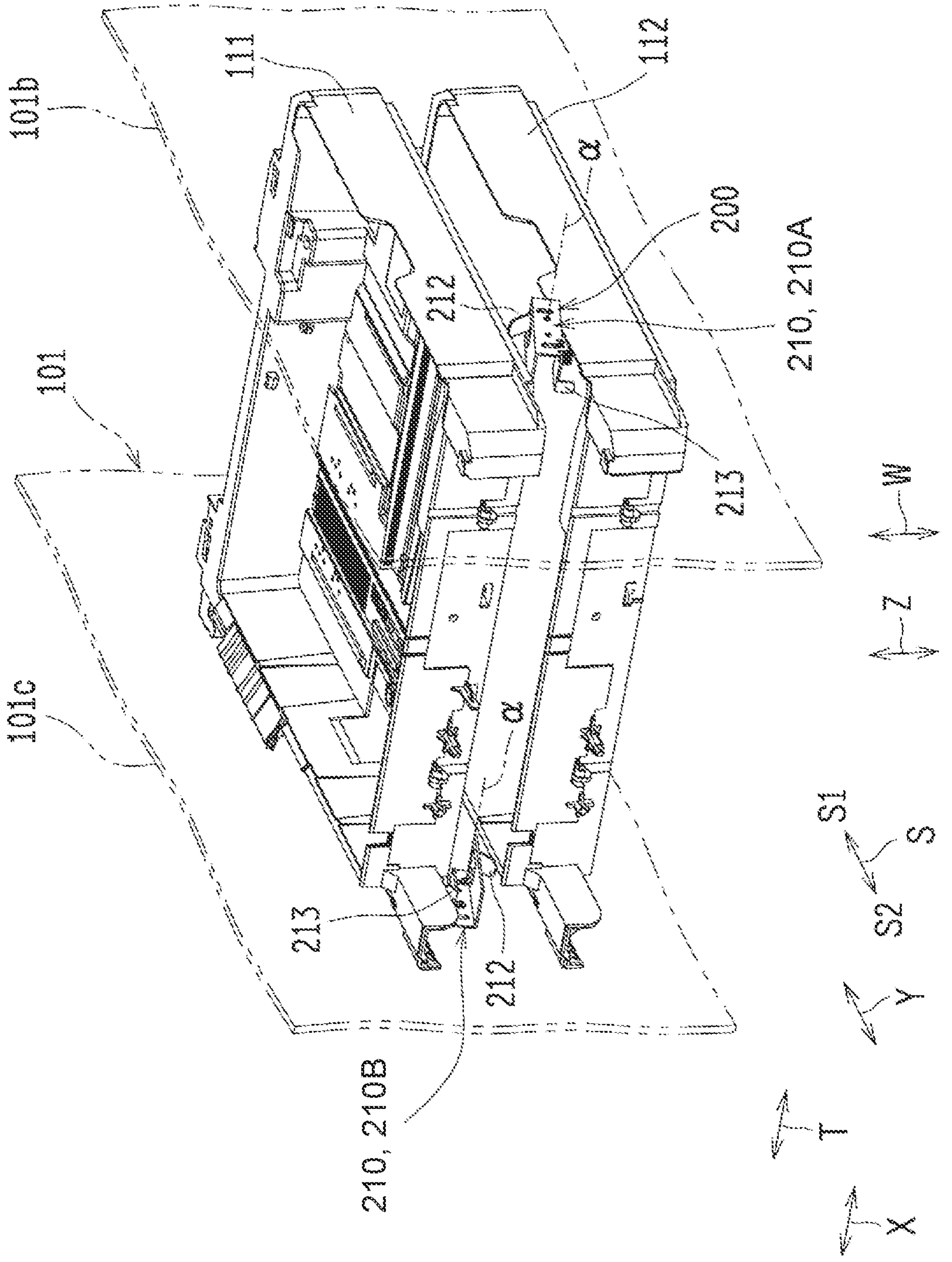
FIG. 17A is a perspective view illustrating an example of the pull-out lock device according to a third embodiment together with the two adjacent sheet containers.
Figure 17B:
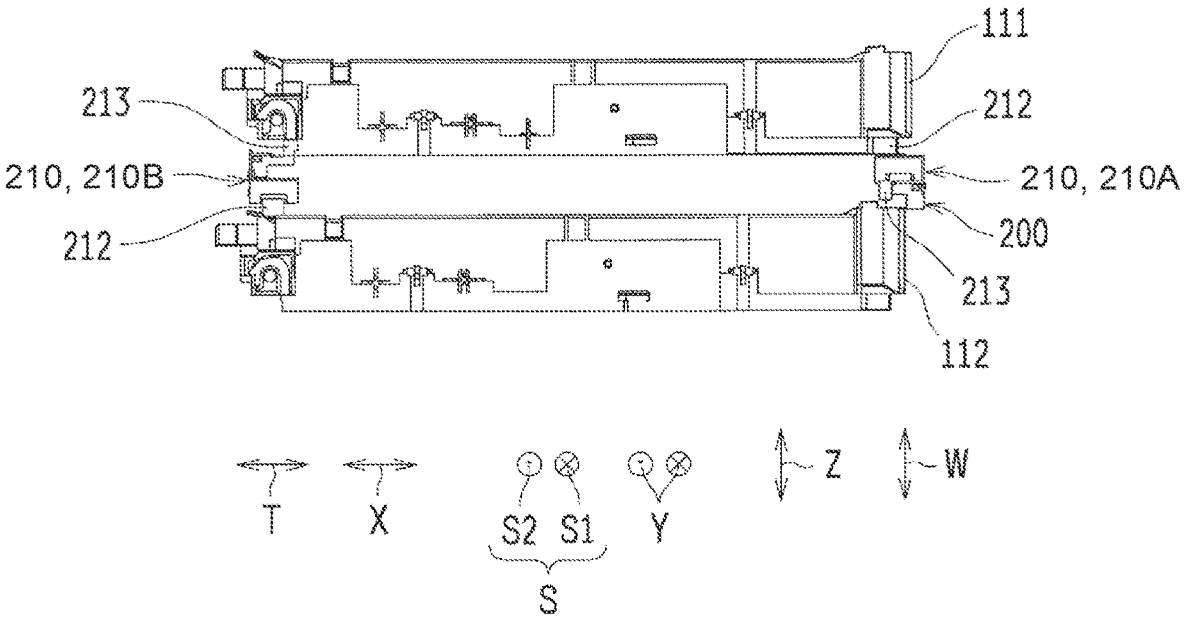
FIG. 17B is a rear view illustrating an example of the pull-out lock device according to the third embodiment together with the two adjacent sheet containers.
Figure 17C:
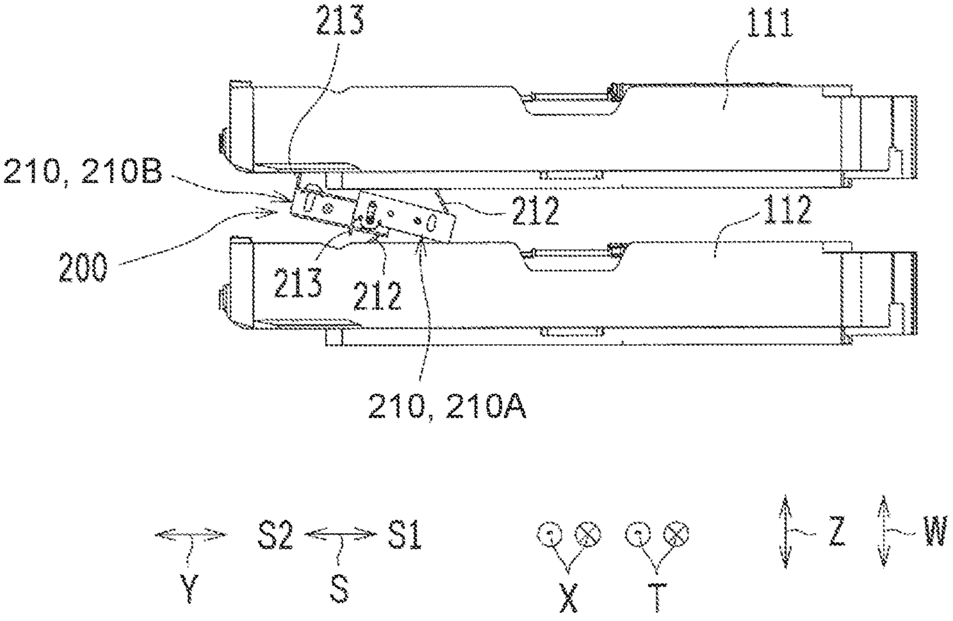
FIG. 17C is a side view illustrating an example of the pull-out lock device according to the third embodiment together with the two adjacent sheet containers.

FIGS. 17A to 17C are a perspective view, a rear view, and a side view, respectively, illustrating an example of the pull-out lock device 200 according to a third embodiment together with the two adjacent sheet containers 111 and 112.

Figure 18A:
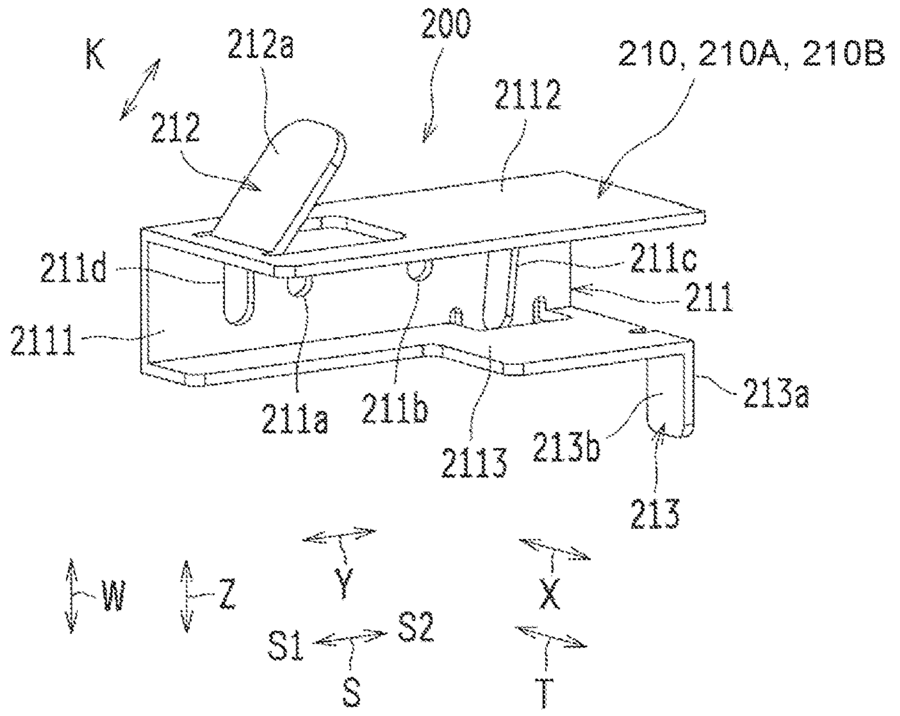
FIG. 18A is a perspective view of an example of the lock member in the pull-out lock device according to the third embodiment when viewed from above diagonally or from below diagonally.
Figure 18B:
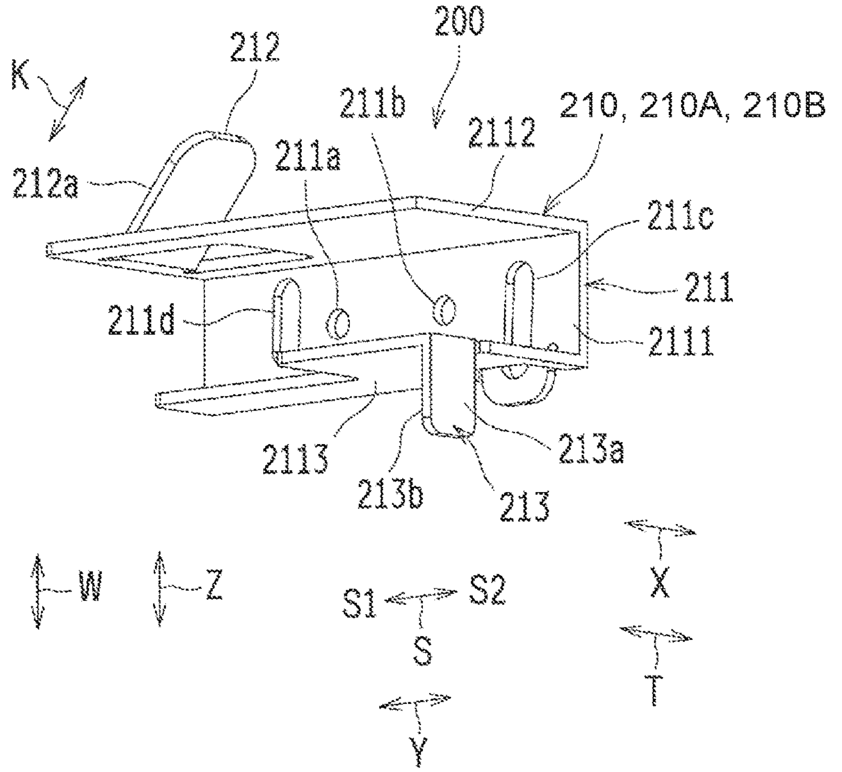
FIG. 18B is a perspective view of an example of the lock member in the pull-out lock device according to the third embodiment when viewed from below diagonally or from above diagonally.

FIG. 18A is a perspective view of an example of the lock member 210 (210A, 210B) in the pull-out lock device 200 according to the third embodiment when viewed from above diagonally or from below diagonally. FIG. 18B is a perspective view of an example of the lock member 210 (210A, 210B) in the pull-out lock device 200 according to the third embodiment when viewed from below diagonally or from above diagonally.

Figure 19A:
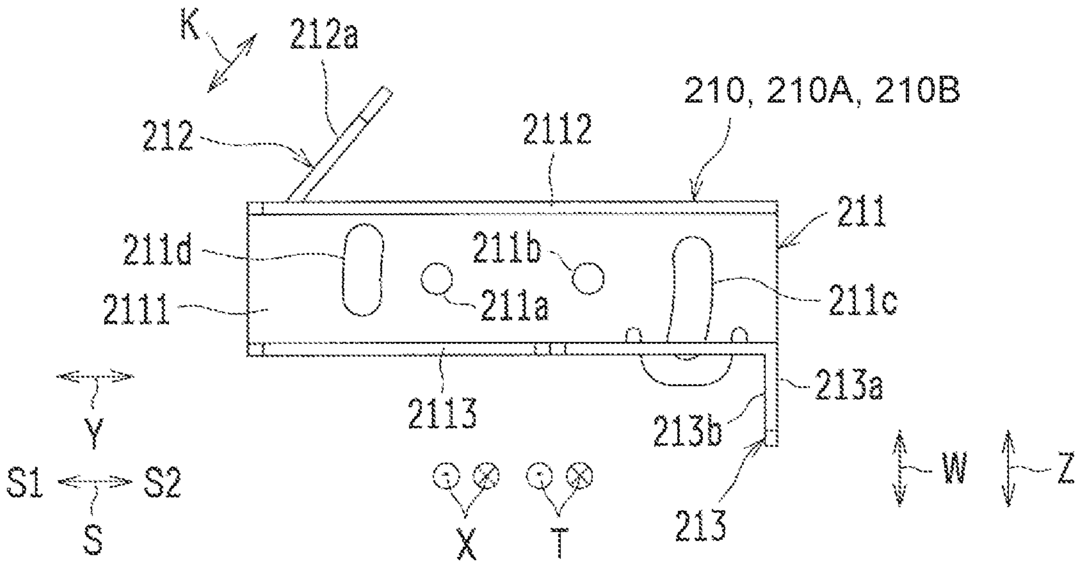
FIG. 19A is a front view of the lock member illustrated in FIGS. 18A and 18B.
Figure 19B:
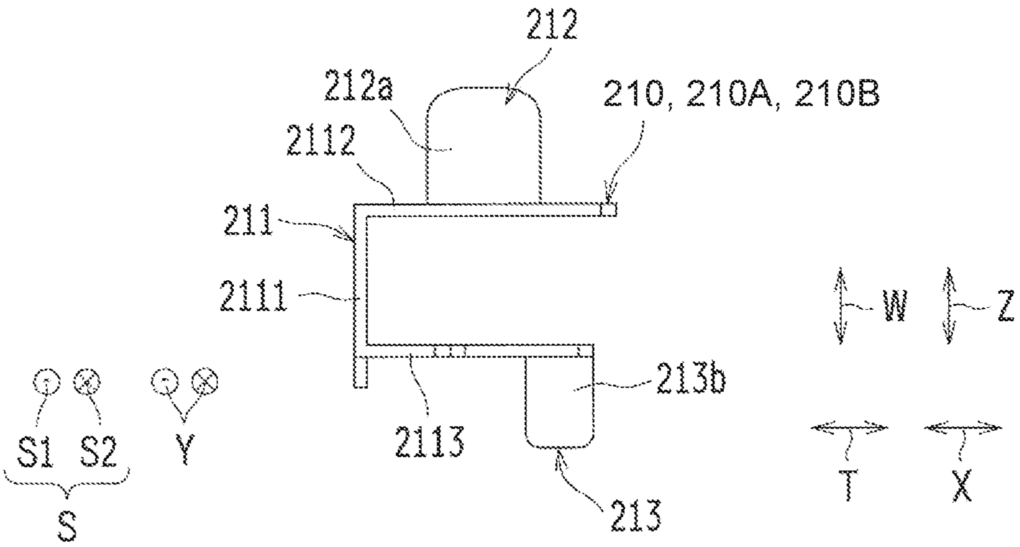
FIG. 19B is a side view of the lock member illustrated in FIGS. 18A and 18B.
Figure 19C:
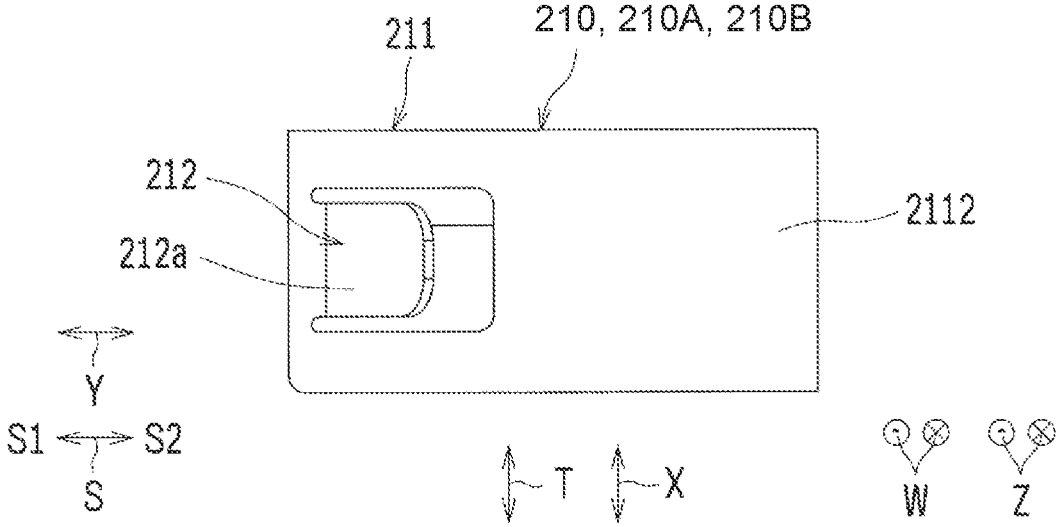
FIG. 19C is a plan view or a bottom view of the lock member illustrated in FIGS. 18A and 18B.

FIGS. 19A to 19C are a front view, a side view, and a plan view or a bottom view, respectively, of the lock member 210 (210A, 210B) illustrated in FIGS. 18A and 18B.

Figure 20A:
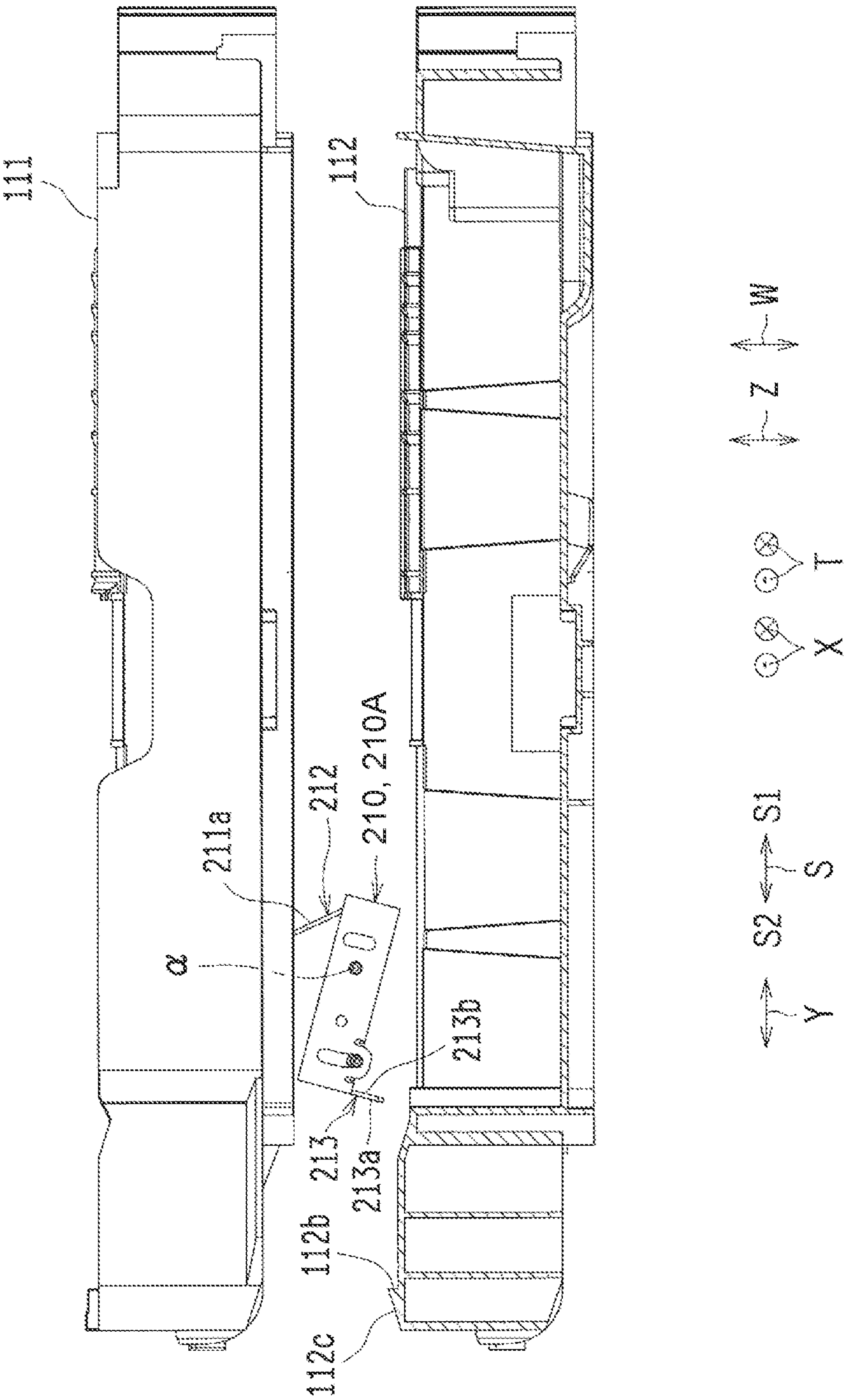
FIG. 20A is a side view illustrating, partially in cross-section, the state where the one lock member is located in an unlock position while the adjacent sheet containers are both accommodated.
Figure 20B:
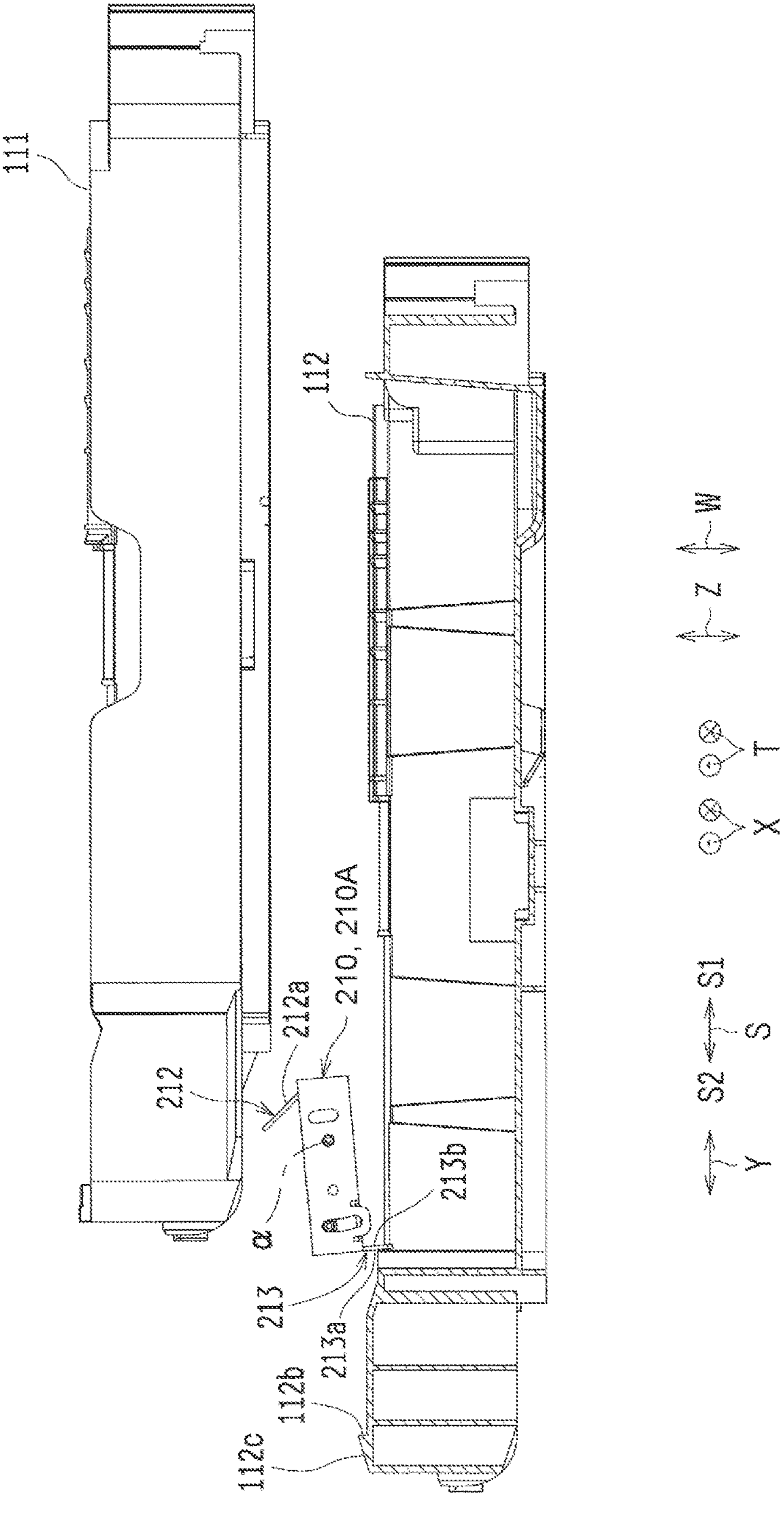
FIG. 20B is a side view illustrating, partially in cross-section, the state where the one lock member is located in a lock position when the one sheet container is pulled out while the other sheet container is accommodated.

FIG. 20A is a side view illustrating, partially in cross-section, the state where the one lock member 210 (210A) is located in the unlock position while the adjacent sheet containers 111 and 112 are both accommodated. FIG. 20B is a side view illustrating, partially in cross-section, the state where the one lock member 210 (210A) is located in the lock position when the one sheet container (111) is pulled out while the other sheet container (112) is accommodated. In FIGS. 20A and 20B, the lower other sheet container (112) is illustrated in cross-section.

Figure 21A:
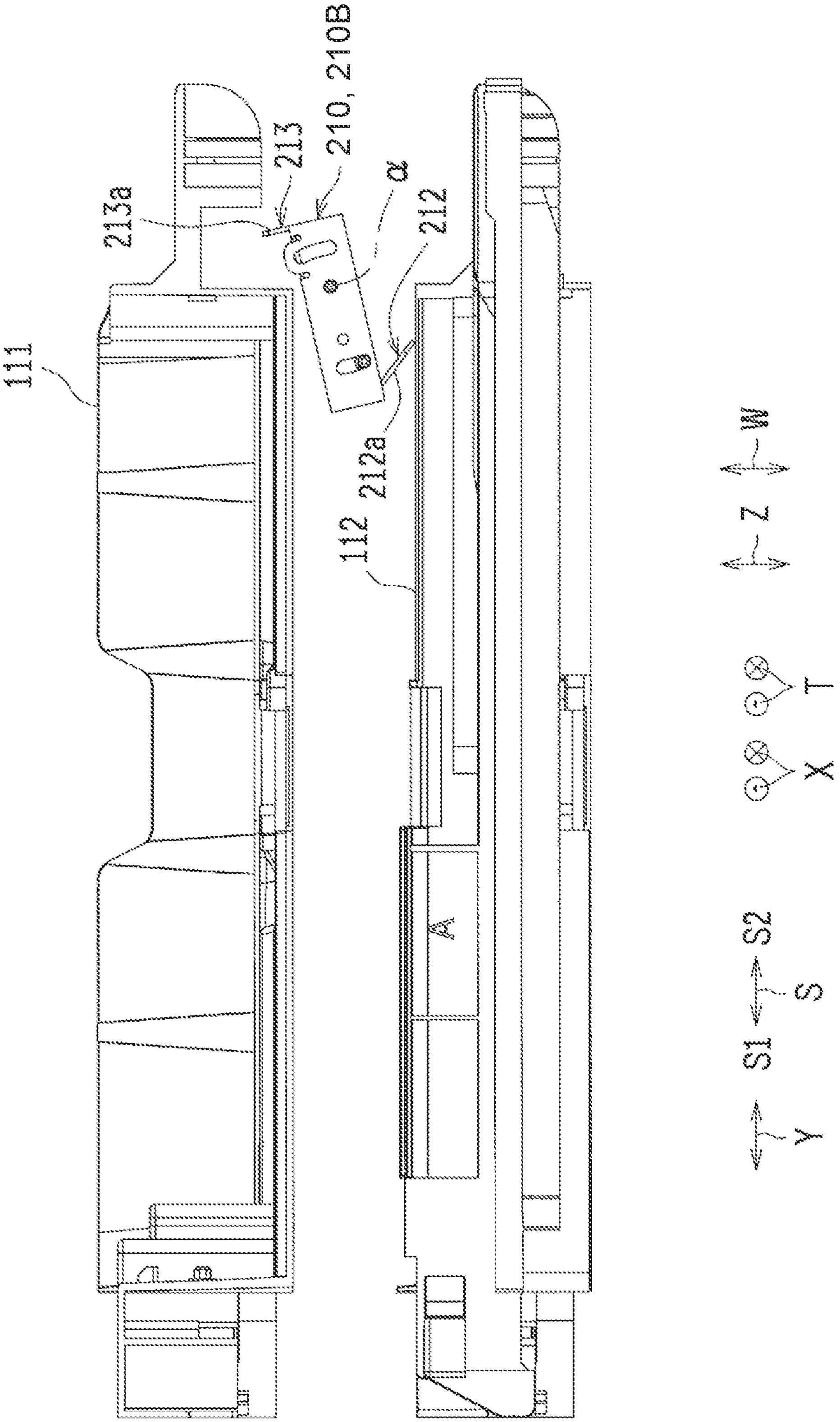
FIG. 21A is a side view illustrating the state where the other lock member is located in the unlock position while the adjacent sheet containers are both accommodated.
Figure 21B:
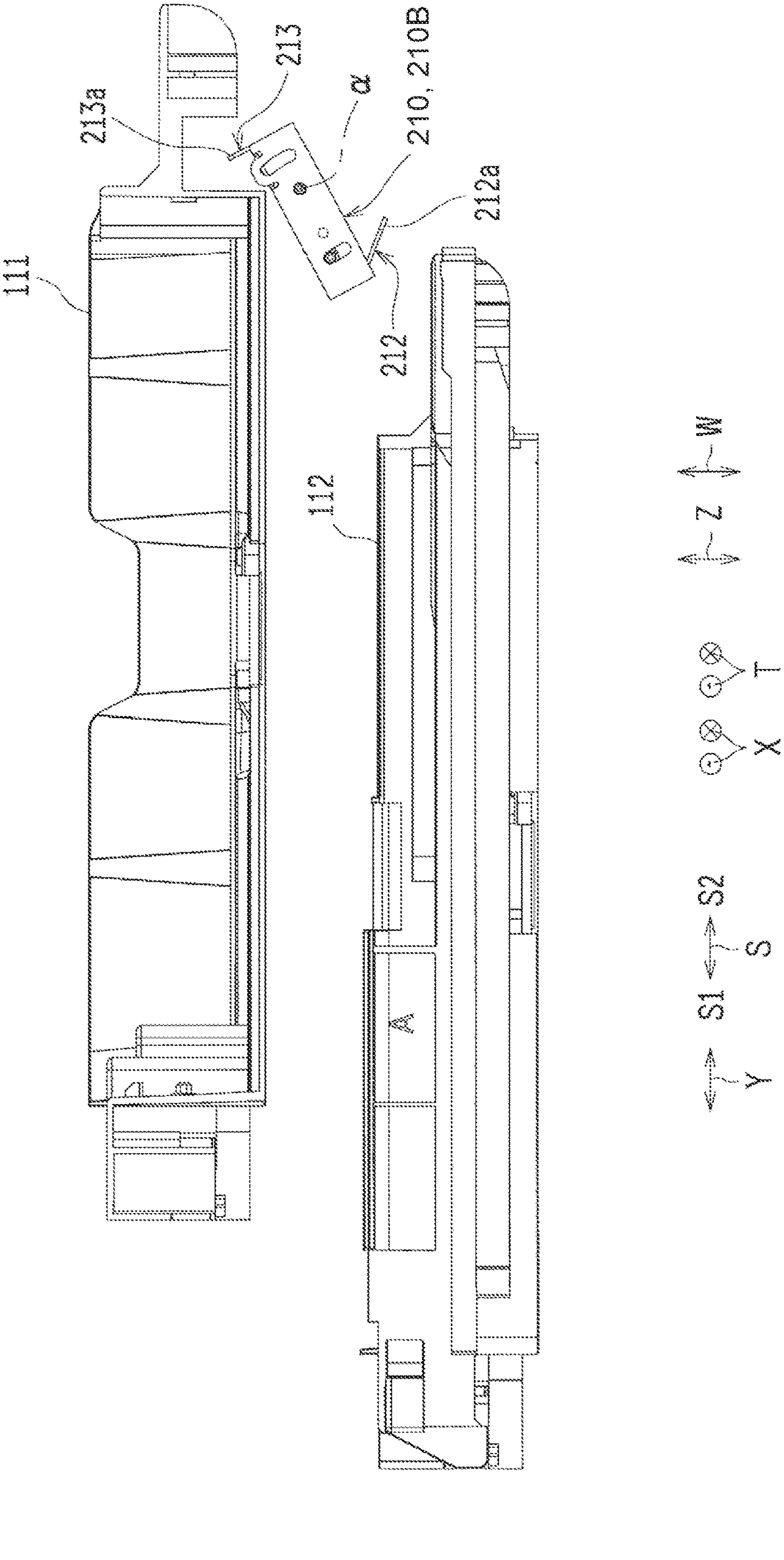
FIG. 21B is a side view illustrating the state where the other lock member is located in the lock position when the other sheet container is pulled out while the one sheet container is accommodated.
Figure 22A:
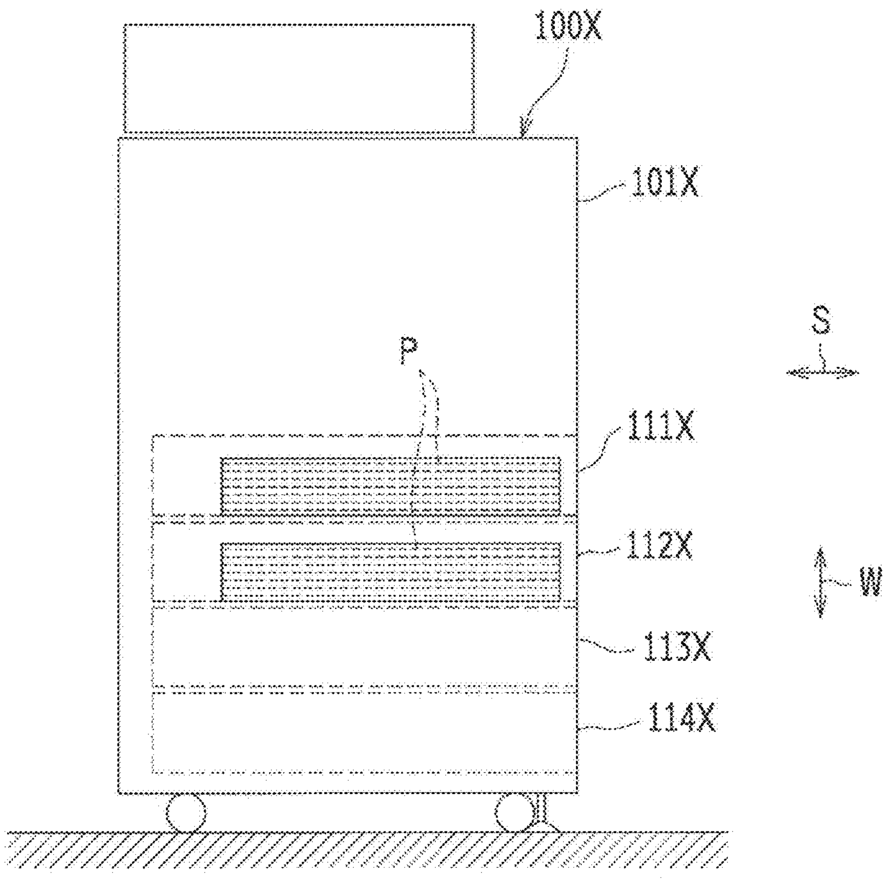
FIG. 22A is a side view schematically illustrating a conventional image-forming apparatus configured to allow a sheet container to be pulled out of an image-forming apparatus main body in a predetermined pull-out direction.
Figure 22B:
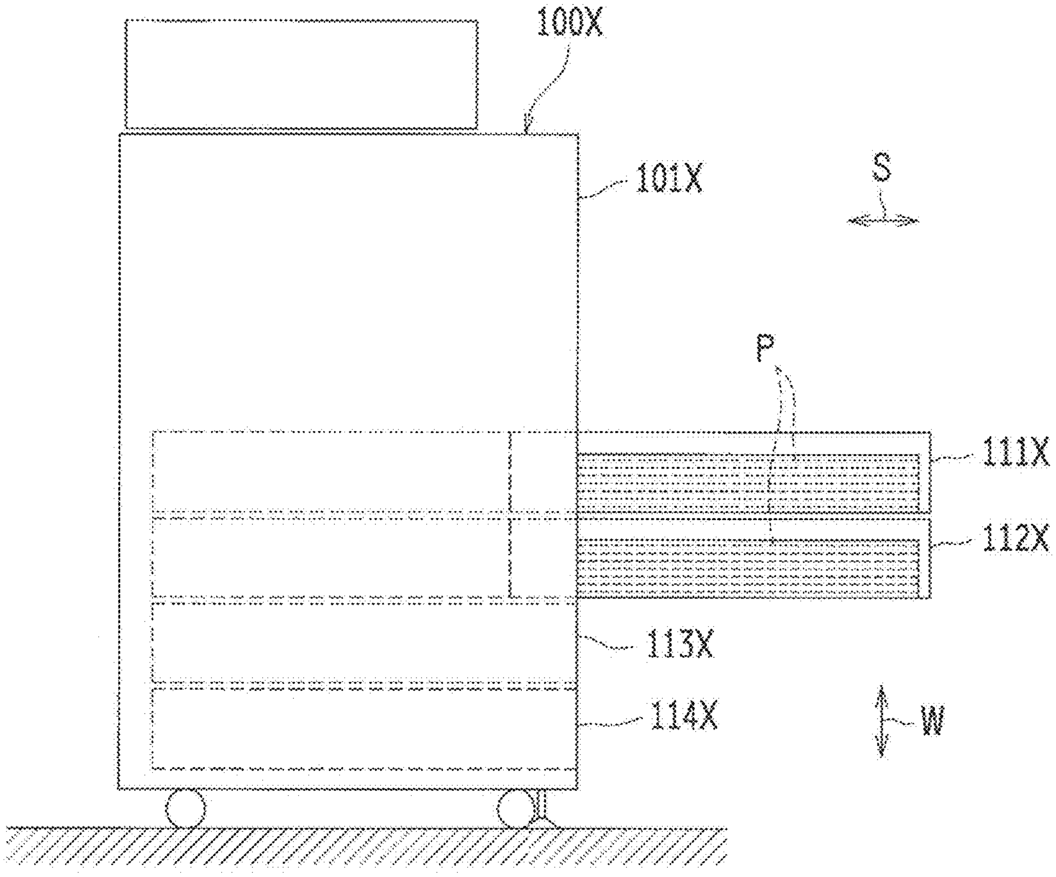
FIG. 22B is a side view schematically illustrating the state where two or more sheet containers are simultaneously pulled out of the image-forming apparatus main body in the image-forming apparatus illustrated in FIG. 22A.

FIG. 21A is a side view illustrating the state where the other lock member 210 (210B) is located in the unlock position while the adjacent sheet containers 111 and 112 are both accommodated. FIG. 21B is a side view illustrating the state where the other lock member 210 (210B) is located in the lock position when the other sheet container (112) is pulled out while the one sheet container (111) is accommodated.

In the pull-out lock device 200 according to the third embodiment, the same configuration as that of the pull-out lock device 200 according to the first embodiment and the second embodiment is denoted by the same reference numeral, and the description thereof is omitted.

According to the present embodiment, the lock members 210 (210A, 210B) are provided in side surface frames (side surface frames on one side or both sides, and in this example, side surface frames 101*b* and 101*c* (See FIG. 17A) on both sides) of the image-forming apparatus main body 101 located at the positions corresponding to side surfaces along the pull-out direction S1 of the sheet containers 111 to 114 accommodated in the image-forming apparatus main body 101. In other words, the lock members 210 (210A, 210B) are provided in the side surface frames 101*b* and 101*c* of the image-forming apparatus main body 101 in the orthogonal direction T from the sheet containers 111 to 114 accommodated in the image-forming apparatus main body 101. The lock member 210 (210A, 210B) is provided so as to be rotatable around the rotation axis a along the horizontal direction (the orthogonal direction T in this example) relative to the side surface frame (101*b*, 101*c*).

Therefore, the lock member 210 (210A, 210B) may be installed in a space outside the sheet containers 111 to 114 accommodated in the image-forming apparatus main body 101 in the orthogonal direction T, and thus a free space on the side of the side surface in the image-forming apparatus main body 101 may be effectively used.

Specifically, in the one lock member 210 (210A) and the other lock member 210 (210B), the male screws 221 (see FIG. 4B) of the rotation shaft member 220 are inserted into either one of the pair of circular through-holes 211*a* and 211*b* and engaged with female screws (not illustrated) provided on the side surface frames 101*b* and 101*c* on both sides. This allows the one lock member 210 (210A) and the other lock member 210 (210B) to rotate around the rotation axes a, a with a simple configuration. In this example, the rotation axis a extends along the orthogonal direction T.

In the one lock member 210 (210A) and the other lock member 210 (210B), the male screws 231 (see FIG. 4A) of the restriction member 230 are inserted into either one of the pair of elongated through-holes 211*c* and 211*d* and are engaged with female screws (not illustrated) provided in the side surface frames 101*b* and 101*c* on both sides. This makes it possible to prevent excessive rotation of the one lock member 210 (210A) and the other lock member 210 (210B) around the rotation axis a with a simple configuration.

According to the present embodiment, a contact surface (112*c*) of the contact member (112*b*) (see FIGS. 20A and 20B), which comes into contact with the lock 213, of the other sheet container (112) is inclined toward the rotation axis a as it is close to the downstream side in the pull-out direction S1.

Accordingly, the second contact surface 213*b* of the one lock member 210 (210A) comes into contact with the inclined contact surface (112*c*) of the other sheet container (112), and thus the other sheet container (112) may be smoothly accommodated in the image-forming apparatus main body 101.

Other Embodiments

According to the first embodiment to the third embodiment described above, the pull-out lock device 200 is used to lock the two adjacent sheet containers 111 and 112, but instead or in addition may be used to lock the two adjacent sheet containers 112 and 113, and/or the two adjacent sheet containers 113 and 114.

According to the present embodiment, the pull-out lock device 200 is configured by using the pair of lock members 210 (210A) and 210 (210B), but may be configured by using a single lock member.

The present invention is not limited to the embodiments described above and may be implemented in other various forms. Therefore, the embodiments are merely examples in all respects and should not be interpreted in a limited way. The scope of the present invention is indicated by the scope of claims and is not restricted by the text of the description. Further, the scope of the present invention includes all modifications and changes belonging to the scope equivalent to the scope of claims.

What is claimed is:

1. A pull-out lock device, provided in an image-forming apparatus main body, that allows a sheet container to be pulled out in a predetermined pull-out direction, the sheet container capable of loading a plurality of sheets and including a plurality of sheet containers placed side by side in a vertical direction in the image-forming apparatus main body, the pull-out lock device for the sheet container comprising a lock member including:

a main body that is attached so as to be rotatable around a rotation axis relative to the image-forming apparatus main body;

a rotation member that supports the main body so as to be rotatable around the rotation axis;

a contact member; and a lock, wherein while two adjacent sheet containers, among the plurality of sheet containers, are both located at an accommodated position in the image-forming apparatus main body, the contact member is in contact with one of the two adjacent sheet containers, such that the lock member rotates around the rotation axis, and the lock moves to an unlock position to allow another one of the two adjacent sheet containers to move in the predetermined pull-out direction, and when the other one of the two adjacent sheet containers is located at the accommodated position and the one of the two adjacent sheet containers is pulled out in the predetermined pull-out direction from the accommodated position and a contact between the one of the two adjacent sheet containers and the contact member is removed, the lock member rotates around the rotation axis, and the lock moves to a lock position to prohibit the other one of the two adjacent sheet containers from moving in the predetermined pull-out direction.

2. The pull-out lock device for the sheet container according to claim 1, wherein the contact member includes a first contact surface that comes into contact with the one of the two adjacent sheet containers, and the first contact surface is inclined to protrude toward the one of the two adjacent sheet containers on an opposite side of the predetermined pull-out direction.

3. The pull-out lock device for the sheet container according to claim 1, wherein the lock is provided to protrude from the main body toward the other of the sheet containers and, at an end of the lock on an opposite side of the pull-out direction, includes a lock surface that comes into contact with the other of the sheet containers to prohibit the other of the sheet containers from moving in the pull-out direction.

4. The pull-out lock device for the sheet container according to claim 1, wherein the lock member is provided in a rear surface frame of the image-forming apparatus main body, the lock member is located at a position corresponding to an end of the plurality of sheet containers accommodated in the image-forming apparatus main body and is on an opposite side of the predetermined pull-out direction.

5. The pull-out lock device for the sheet container according to claim 1, wherein the lock member is provided in a side surface frame of the image-forming apparatus main body located at a position corresponding to a side surface along the pull-out direction of the plurality of sheet containers accommodated in the image-forming apparatus main body.

6. The pull-out lock device for the sheet container according to claim 1, wherein the contact member is provided at one end of the main body and the lock is provided at a side of another end of the main body on an opposite side of the contact member with the rotation member interposed between the contact member and the lock in the main body.

7. The pull-out lock device for the sheet container according to claim 6, wherein when the contact member comes into contact with a lower sheet container of the two adjacent sheet containers, the main body is attached to the image-forming apparatus main body, such that the rotation member is located on a side of the lock from a center of gravity of the lock member, and when the contact member comes into contact with an upper sheet container of the two adjacent sheet containers, the main body is attached to the image-forming apparatus main body, such that the rotation member is located on a side of the contact member from the center of gravity of the lock member.

8. The pull-out lock device for the sheet container according to claim 6, wherein while the two adjacent sheet containers are both accommodated in the image-forming apparatus main body, the contact member is in contact with the one of the two adjacent sheet containers while protruding from one pull-out path of the one of the two adjacent sheet containers in the image-forming apparatus main body and the lock member rotates to the unlock position, such that the lock retracts from another pull-out path of the other one of the two adjacent sheet containers in the image-forming apparatus main body to allow the other one of the two adjacent sheet containers to move in the predetermined pull-out direction, and when the one of the two adjacent sheet containers is pulled out of the image-forming apparatus main body while the other one of the two adjacent sheet containers is accommodated in the image-forming apparatus main body, the contact between the contact member and the one of the two adjacent sheet containers in the one pull-out path is removed and the lock member rotates to the lock position, such that the lock protrudes into the other pull-out path to prohibit the other one of the two adjacent sheet containers from moving in the predetermined pull-out direction.

9. The pull-out lock device for the sheet container according to claim 1, wherein a side end of the lock in the predetermined pull-out direction includes a second contact surface that is inclined in a direction away from the other one of the two adjacent sheet containers toward the predetermined pull-out direction.

10. The pull-out lock device for the sheet container according to claim 1, wherein the main body includes:

a base along both a juxtaposition direction of the plurality of sheet containers and an orthogonal direction that is orthogonal to both the juxtaposition direction and the predetermined pull-out direction; and a first plane that connects to the base along both the predetermined pull-out direction and the orthogonal direction, and the contact member is formed by bending from the first plane along the orthogonal direction.

11. The pull-out lock device for the sheet container according to claim 1, wherein the main body includes:

a base along both a juxtaposition direction of the plurality of sheet containers and an orthogonal direction that is orthogonal to both the juxtaposition direction and the pull-out direction; and a first plane that connects to the base along both the pull-out direction and the orthogonal direction, and the contact member is formed by bending from the first plane along the pull-out direction and further bending along an inclination direction that intersects with both the juxtaposition direction and the pull-out direction.

12. The pull-out lock device for the sheet container according to claim 1, wherein the main body includes:

a base along both a juxtaposition direction of the plurality of sheet containers and an orthogonal direction that is orthogonal to both the juxtaposition direction and the predetermined pull-out direction; and a second plane that connects to the base along both the predetermined pull-out direction and the orthogonal direction, and the lock is formed by bending from the second plane along the predetermined pull-out direction.

13. The pull-out lock device for the sheet container according to claim 1, wherein the main body includes:

a base along both a juxtaposition direction of the plurality of sheet containers and an orthogonal direction that is orthogonal to both the juxtaposition direction and the predetermined pull-out direction; and a second plane that connects to the base along both the predetermined pull-out direction and the orthogonal direction, and the lock is formed by bending from the second plane along the predetermined pull-out direction and further bending along the juxtaposition direction.

14. The pull-out lock device for the sheet container according to claim 1, wherein the lock member is provided between, among the plurality of sheet containers, a first sheet container provided at a highest position and a second sheet container provided at a second highest position.

15. An image-forming apparatus, comprising the pull-out lock device for the sheet container according to claim 1, that allows sheet container to be pulled out of the image-forming apparatus main body in the predetermined pull-out direction, wherein the pull-out lock device further comprises a pair of lock members, including the lock member, in the lock member, included in the pair of lock members, while the two adjacent sheet containers are both accommodated in the image-forming apparatus main body, the contact member is in contact with the one of the two adjacent sheet containers, the lock member rotates, and the lock moves to the unlock position to allow the other one of the two adjacent sheet containers to move in the predetermined pull-out direction, and while the other one of the two adjacent sheet containers is accommodated in the image-forming apparatus main body and the one of the two adjacent sheet containers is pulled out of the image-forming apparatus main body and the contact between the one of the two adjacent sheet containers and the contact member is removed, the lock moves to the lock position to prohibit the other one of the two adjacent sheet containers from moving in the predetermined pull-out direction, and in the other one of the lock members, while the two adjacent sheet containers are both accommodated in the image-forming apparatus main body, the contact member is in contact with the other one of the two adjacent sheet containers, the other one of the lock members rotates, and the lock moves to the unlock position to allow the one of the two adjacent sheet containers to move in the predetermined pull-out direction, and while the one of the two adjacent sheet containers is accommodated in the image-forming apparatus main body and the other one of the two adjacent sheet containers is pulled out of the image-forming apparatus main body and a contact between the contact member and the other one of the two adjacent sheet containers is removed, the lock moves to the lock position to prohibit the one of the two adjacent sheet containers from moving in the predetermined pull-out direction.

16. The image-forming apparatus according to claim 15, wherein the lock member and the other one of the lock members are formed to have an identical shape, and the lock member and the other one of the lock members are provided to be rotatable around the rotation axis relative to the image-forming apparatus main body, such that the contact member and the lock of each of the pair of lock members are in opposite positions.

* * * * *